United States Patent [19]

Shimizu et al.

[11] Patent Number: 5,722,669
[45] Date of Patent: Mar. 3, 1998

[54] RESIN CVJ BOOT WITH DISTINCT LARGE AND SMALL CREST PORTIONS

[75] Inventors: Minoru Shimizu; Yasuyuki Matsuura; Atsushi Ishikawa, all of Gotenba; Shinji Nomura, Kamakura, all of Japan

[73] Assignee: Keeper Co., Ltd., Tokyo, Japan

[21] Appl. No.: 575,524

[22] Filed: Dec. 20, 1995

[30] Foreign Application Priority Data

Sep. 26, 1995 [JP] Japan ................... 7-247714

[51] Int. Cl.$^6$ ................................. F16J 15/52
[52] U.S. Cl. ..................... 277/212 FB; 464/175
[58] Field of Search ............... 277/200, 212 FB; 464/173, 175

[56] References Cited

U.S. PATENT DOCUMENTS

| | | | |
|---|---|---|---|
| 3,442,096 | 5/1969 | Orain | 464/175 |
| 3,511,061 | 5/1970 | Burckhardt et al. | 464/175 |
| 4,278,262 | 7/1981 | Mizutani et al. | 277/212 FB |
| 4,556,399 | 12/1985 | Billet et al. | 277/212 FB |
| 4,693,484 | 9/1987 | Ukai et al. | 277/212 FB |
| 4,735,596 | 4/1988 | Ukai et al. | 277/212 FB |
| 4,805,921 | 2/1989 | Ukai et al. | 277/212 FB |
| 4,844,486 | 7/1989 | Schiemann | 277/212 FRB |
| 4,877,258 | 10/1989 | Alt et al. | 277/212 FB |
| 4,923,432 | 5/1990 | Porter | 277/212 FB |
| 5,015,215 | 5/1991 | Uchida et al. | 277/212 FB |
| 5,236,394 | 8/1993 | Collins et al. | 277/212 FB |
| 5,295,914 | 3/1994 | Milavec | 277/212 FB |
| 5,308,091 | 5/1994 | Mihalcin | 277/212 FB |
| 5,419,741 | 5/1995 | Schwarzler | 277/212 FB |

FOREIGN PATENT DOCUMENTS

| | | | |
|---|---|---|---|
| 3869 | 9/1979 | European Pat. Off. | 277/212 FB |
| 249528 | 12/1987 | European Pat. Off. | 464/175 |
| 4106524 | 2/1991 | Japan . | |
| 160229 | 6/1992 | Japan | 464/175 |

Primary Examiner—Scott Cummings
Attorney, Agent, or Firm—Notaro & Michalos PC

[57] ABSTRACT

The invention relates to a CVJ boot in which contact pressure of crest portions closer to a large-diameter mounting portion on the compressed side of a bellows portion is reduced when slant faces forming a root portion of a bending point obtained by the S-shaped bend come into contact with each other, thereby increasing durability.

20 Claims, 23 Drawing Sheets

5,722,669

RESIN CVJ BOOT WITH DISTINCT LARGE AND SMALL CREST PORTIONS

BACKGROUND OF THE INVENTION

1. Field of the Invention

The present invention relates to a resin boot, such as one in a constant-velocity joint, which is mounted on two shafts rotating with an operating angle (crossed axes angle) therebetween by a large-diameter mounting portion and a small-diameter mounting portion provided at both ends of a bellows portion and used for retaining grease or preventing dust (such a boot is generally referred to as a resin CVJ boot in the present specification). More particularly, the present invention relates to a structure for eliminating disadvantages generated by S-shaped bend of the bellows portion of the resin CVJ boot.

2. Description of the Related Art

In general, a CVJ boot 1 is constituted by comprising a large-diameter mounting portion 4 mounted on an outer wheel portion 6 of a constant-velocity joint 2 and a small-diameter mounting portion 5 mounted on a rotating shaft portion 8 of the same 2 at both ends of bellows portion 3, as shown in FIG. 1. As the CVJ boot 1, a rubber boot which has been mainly used is provided with a bellows portion having two to four crest portions, while a resin boot which has been recently developed is provided with a bellows portion having more crest portions than those of the rubber boot to impart flexibility thereto. For example, as a conventional resin CVJ boot, there has been known a conical boot having six crest portions as shown in FIG. 1.

In case of the resin CVJ boot whose number of crest portions must be increased, there is such a problem as that slant faces forming a root portion provided in the middle of the bellows portions are particularly worn out, disabling long duration of life of the boot.

As a result of various studies for solving this problem by the present inventors and others, it was discovered that deformation of the boot on the compressed side (a side having a smaller crossed axes angle θ) when giving a large operating angle to the constant-velocity joint is actually generated in such a manner that the boot has an S-like shape (this deformation is referred to as an S-shaped bend in the present specification), although it was considered that deformation of the boot is generated in such a manner that the boot has a curve by uniformly compressing all the crest portions in the axial direction. That may be because a center P of the operating angle of the constant-velocity joint deviates from a center O of attachment in the large-diameter mounting portion of the boot as shown in FIG. 1 and all the crest portions on the compressed side are not thereby compressed but they are rather partially expanded in the axial direction. Further, on the expanded side (a side having a large crossed axes angle), not all the crest portions are expanded (developed) but partially compressed. Furthermore, movement of the expanded crest portions encourages movement of the crest portions to be compressed so that the crest portions come in contact with each other, and a contact pressure tends to be increased in the crest portions particularly. Moreover, it was found out that such a phenomenon as that crest portions on the compressed side are not compressed but expanded could occur at the crest portions close to the small-diameter mounting portion.

In addition, it was discovered that, when the boot shows the S-shaped bend, a largest compression force acts on slant faces forming a root portion (the root portion is referred to as a root portion of a bending point in particular in the present specification) between a crest group closer to the small-diameter mounting portion from the bending point and a crest group closer to the large-diameter mounting portion from the bending point. The S-shaped bend is an unavoidable phenomenon, and it can not be helped that the slant faces forming the root portion of the bending point are brought into contact with each other. Further, since the bellows portion is so formed as to have a conical shape as a whole by gradually reducing diameters of the crest portions and those of the root portions from the large-diameter mounting portion toward the small-diameter mounting portion, the slant faces which form one side of each crest portion and face the small-diameter mounting portion (referred to as the small-diameter-mounting-portion-side slant faces in the present specification) are longer than those facing the large-diameter mounting portion (referred to as the large-diameter-mounting-portion-side slant faces). When strong compression force acts on slant faces 31 and 33 forming the root portion 30 of the bending point, a crest portion is pushed in a direction of warpage by a small-diameter-mounting-portion-side slant face 32 which is longer than the large-diameter-mounting-portion-side slant face 31 and forms the opposed side of the crest portion, and a sharp crown 33 hence strongly comes in contact (line contact) with the slant face 33 forming the opposed side of the root portion 30 (See FIG. 5B). Thus, a surface Pressure of the slant faces 31 and 33 forming the root portion 30 of the bending point when these faces come into contact with each other is increased during the S-shaped bend, and these faces are Prominently worn out as compared with any other slant face, thereby shortening duration of life of the boot. Note that the bending point when the bellows portion displays the S-shaped bend means a point between an expanded portion and a compressed portion in the bellows portion on the compressed side when the operating angle is imparted to the joint.

DISCLOSURE OF THE INVENTION

In view of the fact that contact made between slant faces forming a bottom portion of a bending point by the S-shaped bend is an unavoidable phenomenon, it is therefore an object of the present invention to provide a resin CVJ boot which reduces a contact pressure of crest portions closer to a large-diameter mounting portion on the compressed side of the bellows portion and has improved durability.

To achieve this aim, in a resin CVJ boot comprising: a bellows portion constituted by four or more continuous crest and root portions; a large-diameter mounting portion provided to one end of the bellows portion; and a small-diameter mounting portion provided to the other end of the bellows portion, the present invention as defined in claim 1 is characterized in that a large-diameter-mounting-portion-side slant face of a crest portion closer to the small-diameter mounting portion forming a root portion between a crest group closer to the large-diameter mounting portion from a bending point when the bellows portion shows the S-shaped bend and a crest group closer to the small-diameter mounting portion from the bending point is so formed as to have a convex surface curved toward outside of the boot.

in this case, rigidity of the large-diameter-mounting-portion-side slant face of the small-diameter-mounting-portion-side crest portion forming the root portion of the bending point when the bellows portion is bent in the S shape is increased against warpage, and contact between the slant faces forming the root portion of the bending point is hardly made. Further, even if they come into contact with each other, the slant faces having a gentle curvature come into contact with each other, widening the contact area while reducing the surface pressure. Thus, this may results in improvement of durability of the boot.

Moreover, in the resin CVJ boot as defined in claim 1, the present invention is characterized in that a developed length of the curved large-diameter-mounting-portion-side slant face between the crest and root portions is substantially equal to that of a small-diameter-mounting-portion-side slant face between the crest and root portions which forms the opposed side of the same crest portion. The developed length of the slant face between the crest and root portions described herein means a length obtained when the slant face is expanded in the straight line. In this case, even though the strong compression force acts on the bending point during the S-shaped bending, since the developed length of the arced large-diameter-mounting-portion-side slant face between the crest and root portions is substantially equal to that of the small-diameter-mounting-portion-side slant face between the crest and root portions which forms the opposed side of the same crest portion, the top of the crest portion can not be brought into contact with the slant face forming the other side of the root portion of the bending point, namely the small-diameter-mounting-portion-side slant face in a crest group closer to the large-diameter mounting portion when the crest portion warps. That is, the slant faces have gently-curved surfaces and come into contact with each other in wide areas, thus reducing the surface pressure.

Further, in the resin CVJ boot as defined in claim 1, the present invention according to claim 3 is characterized in that at least one large-diameter-mounting-portion-side slant face in a crest group closer to the large-diameter mounting portion has a convex curved surface. In this case, not only the slant faces forming the root portion of the bending point are formed into convex curved surfaces, but also the large-diameter-mounting-portion-side slant faces in the crest group closer to the large-diameter mounting portion where the slant faces are compressed and tend to come into contact with each other are formed into convex curved surfaces, increasing rigidity against warpage of the crest portions. Therefore, contact pressure is weakened not only in the slant faces forming the root portion between a crest group closer to the large-diameter mounting portion and a crest group closer to the small-diameter mounting portion but also in the slant faces in the crest group closer to the large-diameter mounting portion on the compressed side during the S-shaped bending, generating no point at which the slant faces come into contact with each other with locally strong force anywhere.

Furthermore, in the resin CVJ boot as defined in claim 3, the present invention according to claim 4 is characterized in that a developed length of the large-diameter-mounting-portion-side slant face between the crest and root portions, which is constituted by a convex surface curved toward outside of the boot, in a crest group closer to the large-diameter mounting portion is substantially equal to that of the small-diameter-mounting-portion-side slant face between the crest and root portions, which forms the opposed side of the same crest portion. In this case, even though strong compression force acts by the S-shaped bend, no warpage is generated not only at the crown portions closer to the small-diameter mounting portion which forms the root portion of the bending point but also at the crest portion closer to the large-diameter mounting portion which forms the root portion of the bending point on the compressed side, and hence the slant faces come into contact with each other on their gently-curved surfaces in a wide area, reducing the surface pressure.

In addition, in the resin CVJ boot as defined in any of claims 1 to 4, the present invention according to claim 5 is characterized in that a difference in diameter between crest and root portions in a crest group closer to the large-diameter mounting portion is made smaller than a difference in diameter between crest and root portions in a crest group closer to the small-diameter mounting portion. In this case, since a difference in diameter between crest and root portions in a crest group closer to the small-diameter mounting portion is small, a developed length of a crest group closer to the small-diameter mounting portion becomes short, which does not encourage faces forming the root portion of the bending point and crest portions in a crest group closer to the large-diameter mounting portion to be compressed, reducing the contact pressure in these portions.

Further, in the resin CVJ boot as defined in any of claims 1 to 4, the present invention according to claims 6 to 8 is characterized in that rigidity of the root portion between a crest group closer to the large-diameter mounting portion and a crest group closer to the small-diameter mounting portion is greater than that of any other root portion by: making a thickness of the root portion between the crest group closer to the small-diameter mounting portion and the crest group closer to the large-diameter mounting portion larger than that of any other root portion; making an opening angle of the root portion between the crest group closer to the small-diameter mounting portion and the crest group closer to the large-diameter mounting portion larger than that of any other root portion; or additionally providing a reinforcing member to the root portion between the crest group closer to the small-diameter mounting portion and the crest group closer to the large-diameter mounting portion.

In such a case, since rigidity of the root portion between the crest group closer to the small-diameter mounting portion and the crest group closer to the large-diameter mounting portion is large as compared with that of any other root portion, even if the crest group closer to the small-diameter mounting portion on the compressed side is to be developed, movement, i.e., expansion of this group toward the axial direction is suppressed by the root portion having the large rigidity. Therefore, even though a large operating angle of the constant-velocity joint is given, development of the crest group closer to the small-diameter mounting portion on the compressed side is suppressed and the contact pressure at the space between slant faces forming the root portion between the both crest groups and the contact pressure of the crest portions closer to the large-diameter mounting portion are thereby reduced.

Moreover, in the resin CVJ boot as defined in any of claims 1 to 8, the present invention according to claim 9 is characterized in that U-shaped grooves are formed to root portions other than at least two or more root portions closer to the small-diameter mounting portion. In this case, since the crest group closer to the large-diameter mounting portion which has two types of root portions, i.e., V-shaped root portions and U-shaped root portions is apt to be deformed, even if the S-shaped bend is observed in the boot, the developed length of the crest group closer to the small-diameter mounting portion on the compressed side, which has a relatively small degree of freedom as compared with the crest group closer to the large-diameter mounting portion, is small, the strong contact is prevented from occurring in the slant faces forming the root portion of the bending point and compression of the crest portions is not thereby encouraged in the crest group closer to the large-diameter mounting portion, thus reducing the contact pressure in these portions.

Further, the resin CVJ boot according to the present invention as defined in claim 10 is characterized in that a difference in diameter between crest and root portions in the crest group closer to the small-diameter mounting portion from the bending point when the bellows portion displays the S-shaped bend is made smaller than a difference in diameter between crest and root portions in the crest group closer to the large-diameter mounting portion. In this case, even if the constant-velocity joint has a large operating angle, a developed length of the crest group closer to the small-diameter mounting portion which has a small difference in diameter between crest and root portions is small on the compressed side, and at least compression of the crest portions is not encouraged in the crest group closer to the large-diameter mounting portion. Thus, contact pressure is reduced in these portion, improving durability of the boot.

Furthermore, the resin CVJ boot according to the present invention as defined in claim 11 is characterized in that rigidity of the root portion between the crest group closer to the small-diameter mounting portion and the crest group closer to the large-diameter mounting portion is larger than that of any other root portion. Here, in order that rigidity of the root portion between the crest group closer to the small-diameter mounting portion and the crest group closer to the large-diameter mounting portion becomes larger than that of any other root portion, it is preferable that an opening angle of the root portion is larger than that of any other root portion, that a thickness of the root portion is larger than that of any other root portion, or that a reinforcing member is provided to the root portion. In such a case, since rigidity of the root portion provided on the boundary between the crest group closer to the small-diameter mounting portion and the crest group closer to the large-diameter mounting portion in the bellows portion is larger than that of any other root portion, even if the crest group closer to the small-diameter mounting portion is to be developed on the compressed side when the boot is bent by imparting the operating angle, movement, i.e., expansion of the group toward the axial direction is suppressed by the root portion having the large rigidity. Accordingly, even if the constant-velocity joint has a large operating angle, development of the group of crest portions closer to the small-diameter mounting portion is suppressed on the compression side, and at least the contact pressure of the crest portions closer to the large-diameter mounting portion can be reduced, improving durability of the boot. Also, when rigidity of the root portion provided on the boundary between the two crest groups is greater than that of any other root portion by forming the opening angle of the root portion to be larger than that of any other root portion or by making the thickness of the root portion to be large, the boot can be easily manufactured by only changing a forming die, and any other member is not hence required. In addition, when rigidity of the root portion provided on the boundary between the two crest groups is made to be larger than that of any other crest portion by providing a reinforcing member thereto, it is sufficient to prepare only the reinforcing member such as an O-ring without changing the structure of the boot.

Moreover, the resin CVJ boot according to the present invention as defined in claim 15 is characterized in that two-tier root portions are provided by forming U-shaped grooves to root portions other than at least two or more root portions closer to the small-diameter mounting portion from the bending point when the bellows portion displays the S-shaped bend. Here, it is preferable that a number of two-tier root portions each having a U-shaped groove is substantially the same with a number of other root portions.

As compared with the crest group, having general type root portions, closer to the small-diameter mounting portion, the group of crest portions closer to the large-diameter mounting portion which have two-tier root portions having V and U shapes tends to be easily deformed. Thus, even if the constant-velocity joint has a large operating angle, a developed length of the crest group closer to the small-diameter mounting portion is reduced on the compressed side, and at least compression of the crest portions in the crest groups closer to the large-diameter mounting portion is not encouraged, reducing the contact pressure in these portions.

In addition, a difference in diameter between crest and root portions in the crest portions including two-tier root portions having U-shaped grooves is distinguished from a difference in diameter between crest and root portions in other crest portions in the resin CVJ boot according to the present invention as defined in claim 15, and a difference in diameter between crest and root portions in the crest group closer to the small-diameter mounting portion is smaller than that in the crest portions having the U-shaped grooves, closer to the large-diameter mounting portion. In this case, since a difference in diameter between crest and root portions in the crest group closer to the small-diameter mounting portion is small, a developed length of the group is short, and at least compression of the crest portions in the crest group closer to the large-diameter mounting portion is prevented from being encouraged, thereby reducing the contact pressure in these portions.

Further, the resin CVJ boot according to the present invention as defined in claim 15 is characterized in that rigidity of the root portion becomes large by making an opening angle of the root portion between the crest group closer to the small-diameter mounting portion and the crest group closer to the large-diameter mounting portion large than that of any other root portion in the bellows portion, by making a thickness of the root portion between the crest group closer to the small-diameter mounting portion and the crest group closer to the large-diameter mounting portion larger than that of any other root portion, or by providing a reinforcing member to the root portion between the crest group closer to the small-diameter mounting portion and the crest group closer to the large-diameter mounting portion. In this case, since rigidity of the root portion provided on the boundary between the crest group closer to the small-diameter mounting portion and the crest group closer to the large-diameter mounting portion is larger than that of any other root portion in the bellows portion, even if the crest group closer to the small-diameter mounting portion is to be developed on the compressed side when the boot is bent by imparting the operating angle thereto, movement, i.e., expansion of the group toward the axial direction is suppressed by the root portion having the large rigidity. Therefore, even though the constant-velocity joint has a large operating angle, development of the crest group closer to the small-diameter mounting portion is suppressed on the compressed side, and at least the contact pressure of the crest portions closer to the large-diameter mounting portion can be further reduced.

BEST STATES FOR EMBODYING THE PRESENT INVENTION

The structure of the present invention will now be described in detail hereinbelow with reference to illustrated embodiments.

Figure 2:
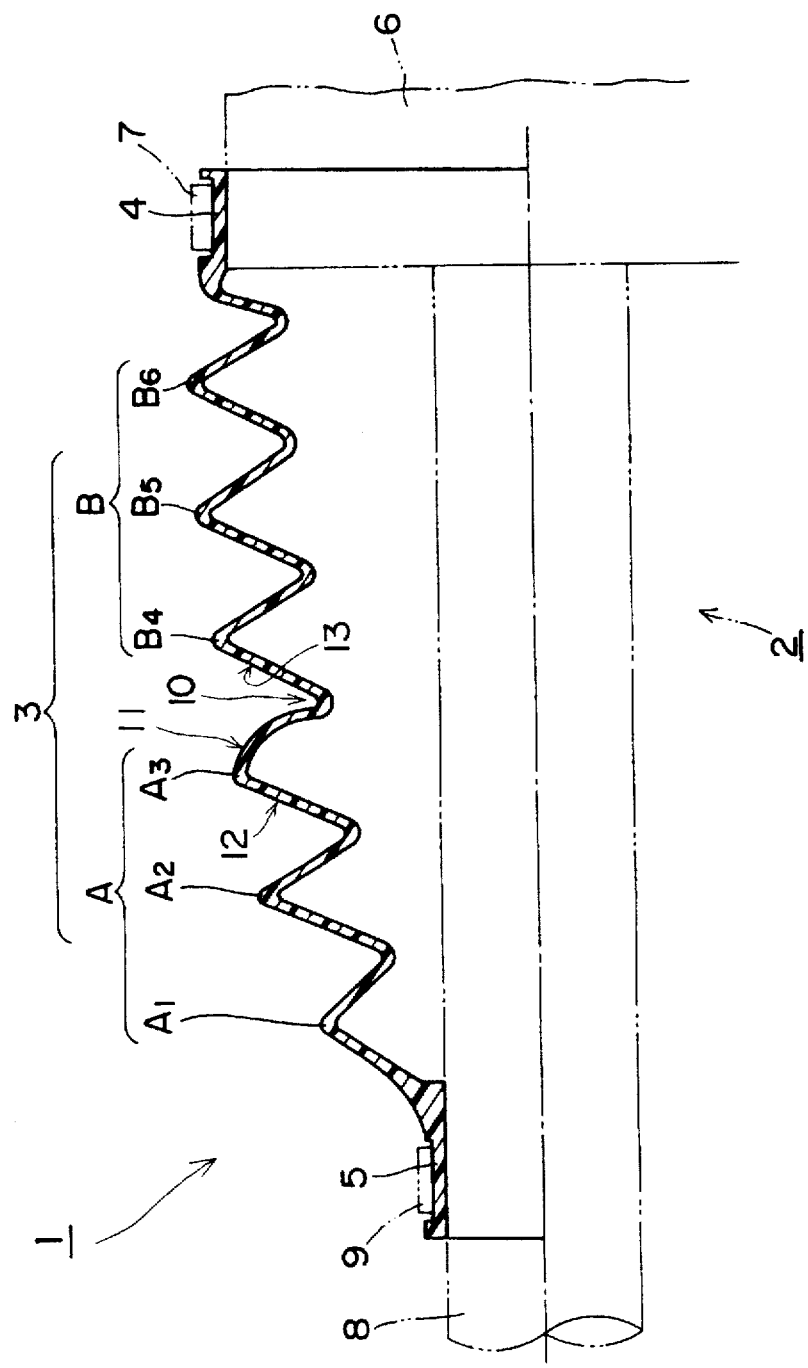
FIG. 2 is a vertical section showing a first embodiment of a resin CVJ boot according to the present invention, in which only half part of the boot from a central line is shown as well as a constant-velocity joint.

FIG. 2 shows a first embodiment of a resin CVJ boot according to the present invention. The resin CVJ boot 1 is so formed as to be easily deformed by providing more crest-portions than those of a rubber boot. Usually, in case of the CVJ boot, at least four to six crest portions or, six or more crest portions are formed depending on the cases. The CVJ boot 1 of this embodiment includes: a bellows portion 3 having continuous crest and root portions, a number of the crest portions being six; a large-diameter mounting portion 4 engaged with an outer wheel portion 6 of a constant-velocity joint 2 at one end of the bellows portion 3; and a small-diameter mounting portion 5 engaged with a rotating shaft portion 8 of the constant-velocity joint 2 at the other end of the bellows portion 3. The large-diameter mounting portion 4 and the small-diameter mounting portion 5 are fastened and fixed to the constant-velocity joint 2 by fixing members 7 and 9. Note that thermoplastic resin is generally used as the resin constituting the boot 1.

Figure 4A:
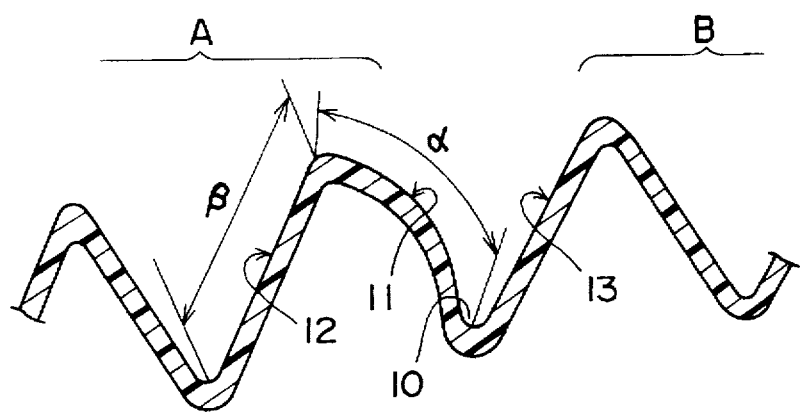
FIG. 4A is an enlarged vertical section showing a form of the resin CVJ boot of FIG. 2 with a root portion between a crest group closer to a small-diameter mounting portion and a crest group closer to a large-diameter mounting portion in the center.
Figure 4B:
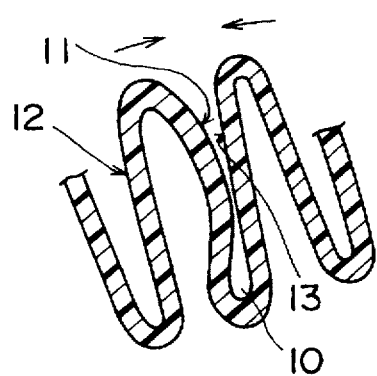
FIG. 4B is a sectional view showing a deformed state of the boot of FIG. 4A.
Figure 5A:
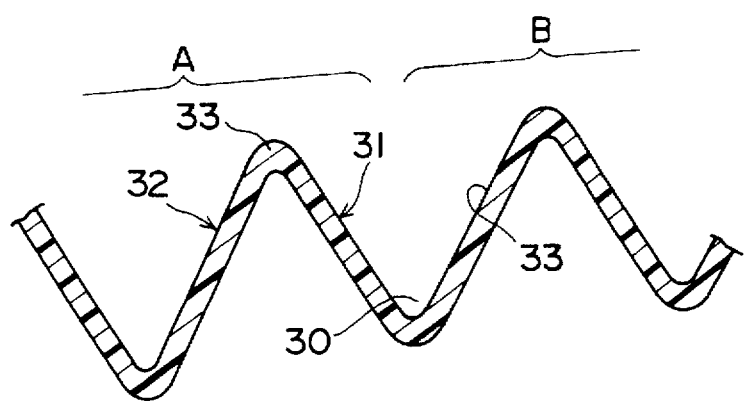
FIG. 5A is an enlarged vertical section showing a form of the conventional resin CVJ boot with a root portion between a crest group closer to the small-diameter mounting portion and a crest group closer to the large-diameter mounting portion in the center.
Figure 5B:
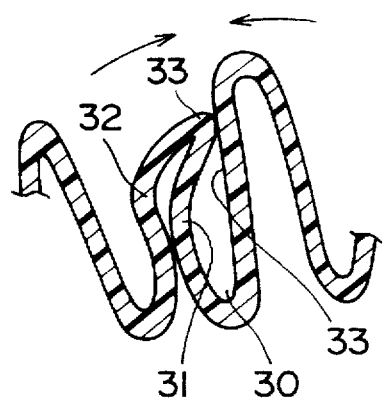
FIG. 5B is a vertical section showing a deformed state of the boot of FIG. 5A.

The bellows portion 3 is largely divided into two crest groups A and B, i.e., the crest group B closer to the larger-diameter mounting portion 4 from a bending point when the bellows portion displays the S-shaped bend and the crest group A closer to the smaller-diameter mounting portion 5 from the same, and a larger-diameter-mounting-portion-side slant face 11 of the crest group A closer to the small-diameter mounting portion, which forms a root portion 10 between the both crest groups A and B, is so formed as to have a convex surface curved toward outside of the boot. Here, it is preferable that a developed length (a length of the slant face when it is straightened) of the curved large-diameter-mounting-portion-side slant face 11 between the crest and root portions is substantially the same with a developed length of a small-diameter-mounting-portion-side slant face 12 forming the opposed side of the crown portion between the crest and root portions. For example, as shown in FIG. 4A, a length a of the large-diameter-mounting-portion-side slant face 11 and a length β of the small-diameter-mounting-portion-side slant face 12 are so set as to have a relation of a α≈β. In this case, as shown in FIG. 4B, even though a large compression force is applied, a crest portion A3 can not be warped, and the large-diameter-mounting-portion-side slant face 11 having a gently-curved surface comes into contact with the straight small-diameter-mounting-portion-side slant face 13 forming the opposed side of the root portion 10, reducing a surface pressure. Further, although the crest group B closer to the large-diameter mounting portion 4 is different from the crest group A closer to the small-diameter mounting portion 5 in the shape of the large-diameter-mounting-portion-side slant face 11 forming the root portion 10 of the bending point, other slant faces of these groups are formed by substantially-straight lines and thickness of them is also substantially the same.

Figure 3:
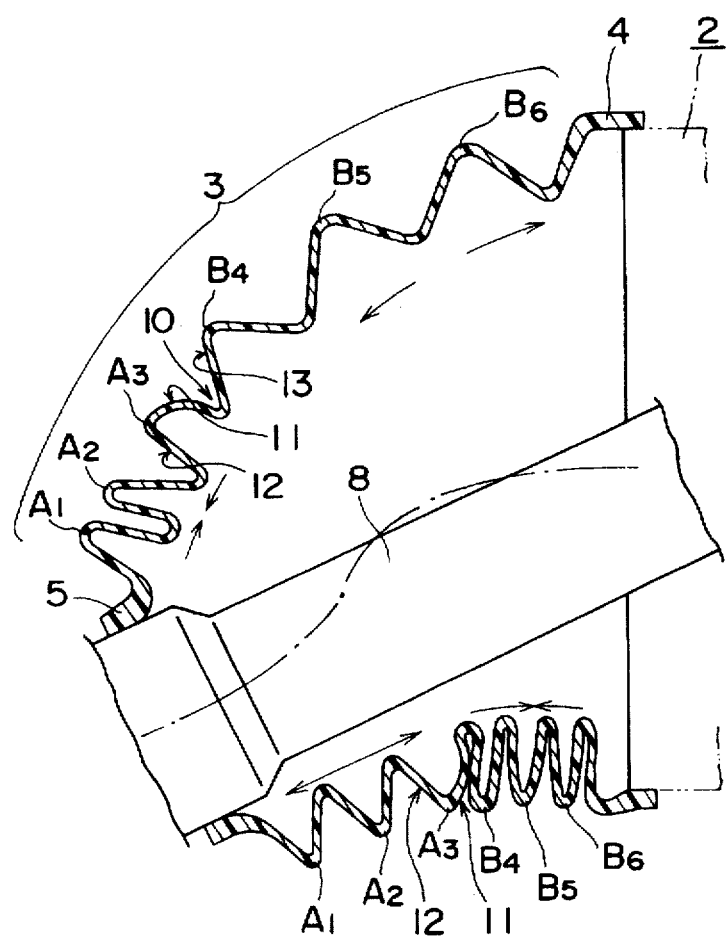
FIG. 3 is an explanatory view showing a deformed state of the boot illustrated in FIG. 2 when the constant-velocity joint has an operating angle.

According to the resin CVJ boot 1 configured as mentioned above, the boot 1 changes its shape as shown in FIG. 3, when a large operating angle is imparted to the constant-velocity joint. Note that the upper part of the rotating shaft portion 8 is an expanded side and the lower part of the same is a compressed side in the bellows portion 3 in FIG. 3. This relation is the same throughout the similar drawings, thereby omitting the explanation thereabout.

For example, in the case where the CVJ boot 1 is bent due to the operating angle of the constant-velocity joint as shown in FIG. 3, the crest group B closer to the large-diameter mounting portion 4 is compressed in the axial direction and the crest group A closer to the small-diameter diameter mounting portion 5 is conversely developed on the compressed side. Meanwhile, the crest portions B4 to B6 belonging to the crest group B closer to the large-diameter mounting portion are also expanded and the crest portions A1 to A3 belonging to the crest group A closer to the small-diameter mounting portion are conversely compressed on the expanded side. The entire boot 1 thus displays the S-shaped deformation, and the strong compression force acts on the compressed side so that slant faces 11 and 13 forming the root portion 10 of the bending point are brought into contact with each other on the compressed side. However, since the large-diameter-mounting-portion-side slant face 11 is so formed as to have a convex surface and high rigidity, it is hard to be deformed even if the strong compression force is applied thereto. Accordingly, the slant faces 11 and 13 forming the root portion 10 are not be completely prevented from coming into contact with each other, but the strong contact which may cause abrasion can be avoided. Further, since the entire boot is not sharply bent with one radius of curvature, the inner circumferential surface does not come into contact with the rotating shaft 8 of the constant-velocity joint 2.

Figure 6:
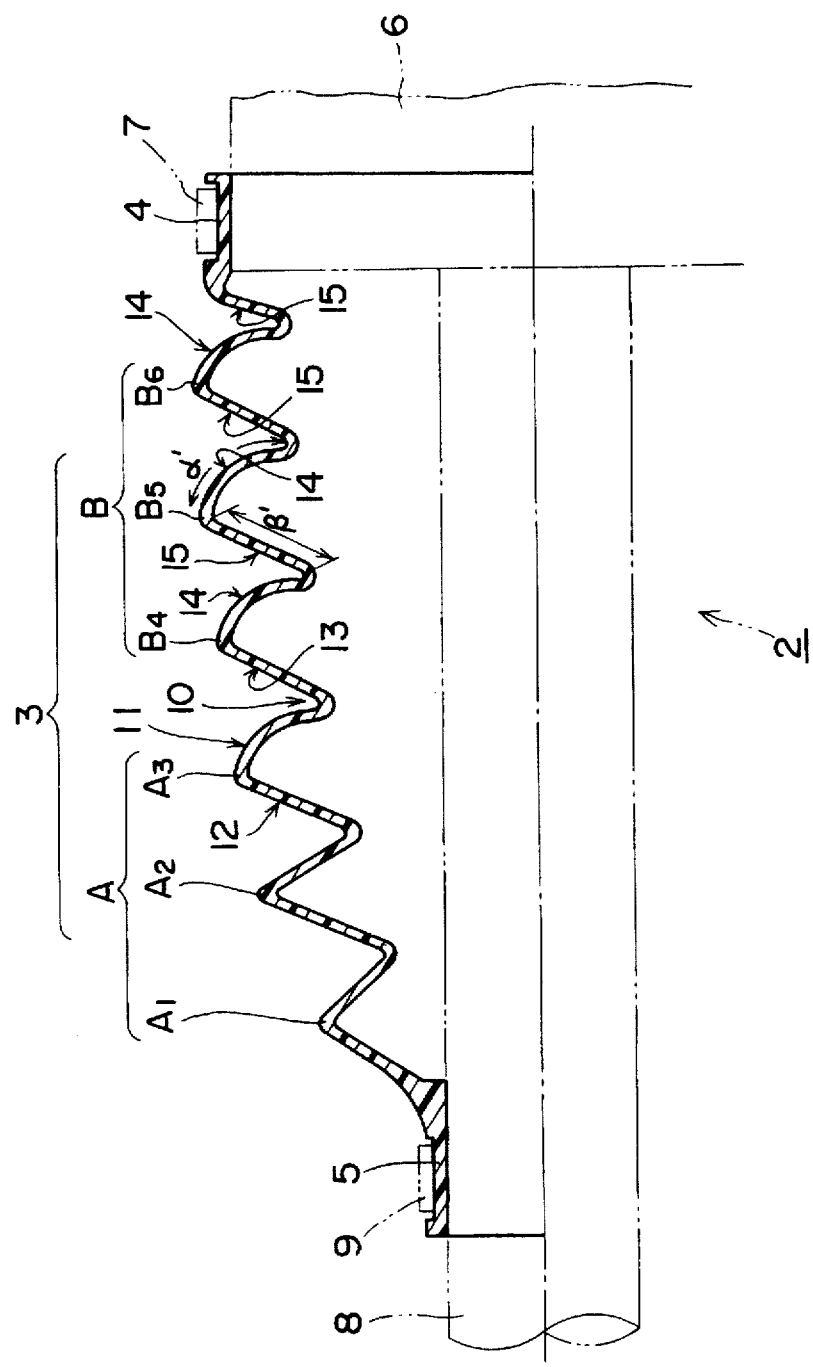
FIG. 6 is a vertical section showing a second embodiment of a resin CVJ boot according to the present invention, in which only a half part of the boot from a central line is illustrated as well as a constant-velocity joint.

FIG. 6 shows a second embodiment. In this embodiment, not only the large-diameter-mounting-portion-side slant surface 11 forming the root portion 10 of the bending point has a convex surface, but also at least one or more large-diameter-mounting-portion-side slant faces 14 of the crest group B closer to the large-diameter mounting portion are so formed as to have convex surfaces. In this case, the large-diameter-mounting-portion-side slant faces 14 which tend to be brought into contact with each other by compression in the crest group B closer to the large-diameter mounting portion, as well as the slant faces 11 and 13 forming the root portion 10 of the bending point, are formed so as to have convex surfaces, resulting in the high rigidity against warpage of the crest portions B4, B5 and B6. Accordingly, contact made between the slant faces 14 and 15 in the crest group B closer to the large-diameter mounting portion, as well as that made between the slant faces 11 and 13 forming the root portion 10 of the bending point, is weakened at the time of the S-shaped bend on the compressed side, and portions which come into contact with each other with the locally-strong force are not observed anywhere. Furthermore, in the boot of this embodiment, it may be preferable that a developed length $\alpha 40$ of each of the large-diameter-mounting-portion-side slant faces 14 having convex surfaces between the crest and root portions is substantially the same with a developed length $\beta'$ of each of the small-diameter-mounting-portion-side slant faces 15 between the crest and root portions on the opposed side of the respective crest portions B4 to B6. In this case, even if the strong compression force acts at the time of the S-shaped bend, since the developed length of the curved large-diameter-mounting-portion-side slant face 14 extending from the crest portion to the root portion is substantially the same with a developed length of the straight small-diameter-mounting-portion-side slant face 15, which forms the opposed side of the same crest portion, extending from the crest portion to the root portion ($\alpha' \approx \beta'$), no warpage occurs not only at the crest portion A3 forming the root portion 10 in the crest group A closer to the small-diameter mounting portion but also in the crest group B closer to the large-diameter mounting portion on the compressed side, and contact can be made between the slant faces 11 and 13 and between the slant faces 14 and 15 on the larger area thereof with a gentle curvature, thereby further reducing the surface pressure.

Figure 7:
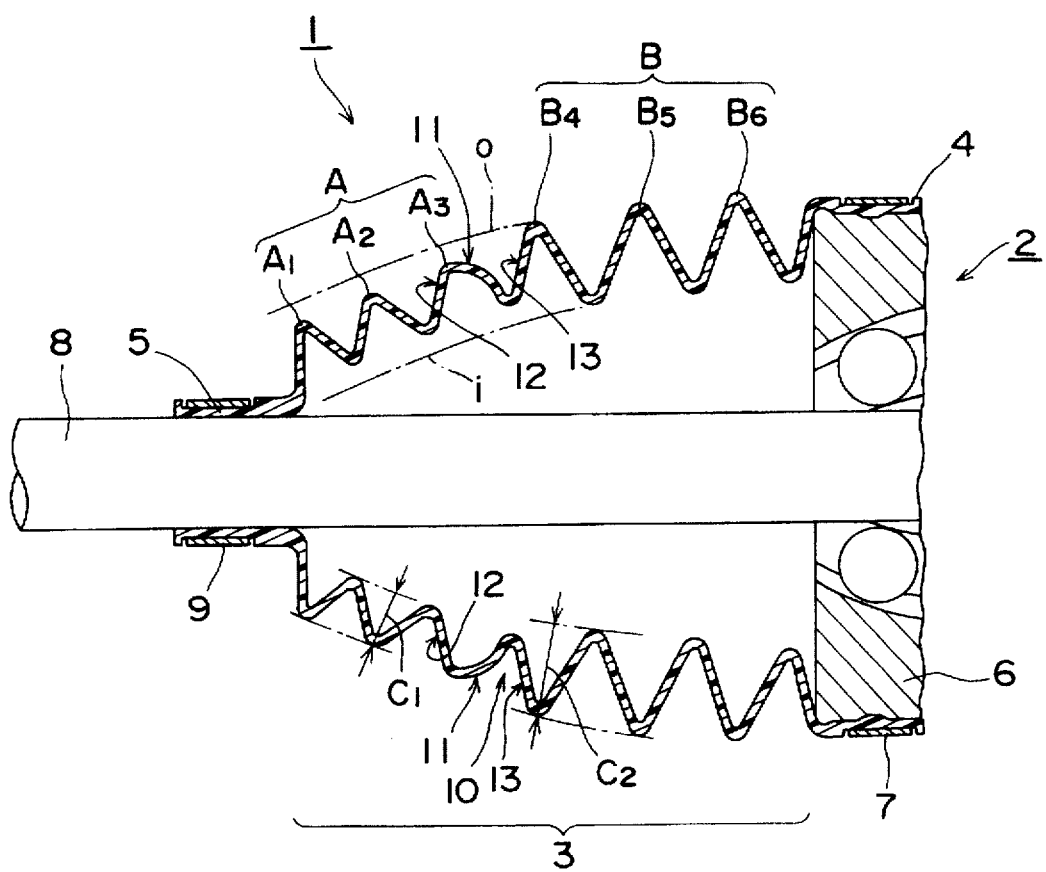
FIG. 7 is a vertical section showing a third embodiment of a resin CVJ boot according to the present invention.

Moreover, FIG. 7 shows a third embodiment according to the present invention. In this embodiment, in regard of differences C1 and C2 in diameter between the crest and root portions of respective crest portions in two crest groups A, B, the difference of the crest portions A1 to A3 belonging to the crest group A closer to the small-diameter mounting portion 5 is smaller than that of the crest portions B4 to B6 belonging to the crest group B closer to the large-diameter mounting portion 4. Of course, there may be or may not be a distinction in the differences of the crest portions belonging to the same crest group. Thus, the largest one among the differences C1 in diameter between the crest and root portions in the crest group A closer to the small-diameter mounting portion is made smaller than the smallest one among the differences C2 in diameter between the crest and root portions in the crest group B closer to the large-diameter mounting portion 4. Here, the difference in diameter between the crest and root portions described herein means a difference from the crown portions to the root portions (or the bottom points on the inner circumferential surface side in the case where U-shaped grooves are provided as in an embodiment shown in FIG. 8) of the crest portions A1 to A3 or crest portions B4 to B6 constituting one crest group, namely, a height of the crest portion. It is naturally possible to set the differences in diameter between the crest and root portions equally with respect to the crest portions belonging to the same crest group.

For example, if a number of crest portions of the bellows portion 3 is six, a first crest portion A1, a second crest portion A2 and a third crest portion A3 belong to the crest group A closer to the small-diameter mounting portion 5, while a fourth crest portion B4, a fifth crest portion B5 and a sixth crest portion B6 belong to the crest group B closer to the large-diameter mounting portion 4. In this example, if the root portion 10 provided on the boundary between the crest group B closer to the large-diameter mount portion from the bending point during the S-shaped bend and the crest group A closer to the small-diameter mount portion from the same is provided at such a position that the number of the crest portions can be equally divided in two, the root portion 10 functions as a boundary between the small difference C1 in diameter between the crest and root portions of the third crest portion A3 and the large difference C2 in diameter between the crest and root portions of the fourth crest portion B4. Here, the respective crest and root portions of the crest group A are so provided as to be positioned between the crest portions and the root positions of the crest group B. Namely, the crest and root portions of the crest group A can be accommodated between the inner diameter position (represented by a line i) of the root portions and the outer diameter position (represented by a line o) of the crest portions in the crest group B, the both position being assumed at the position of the crest group A.

Figure 13:
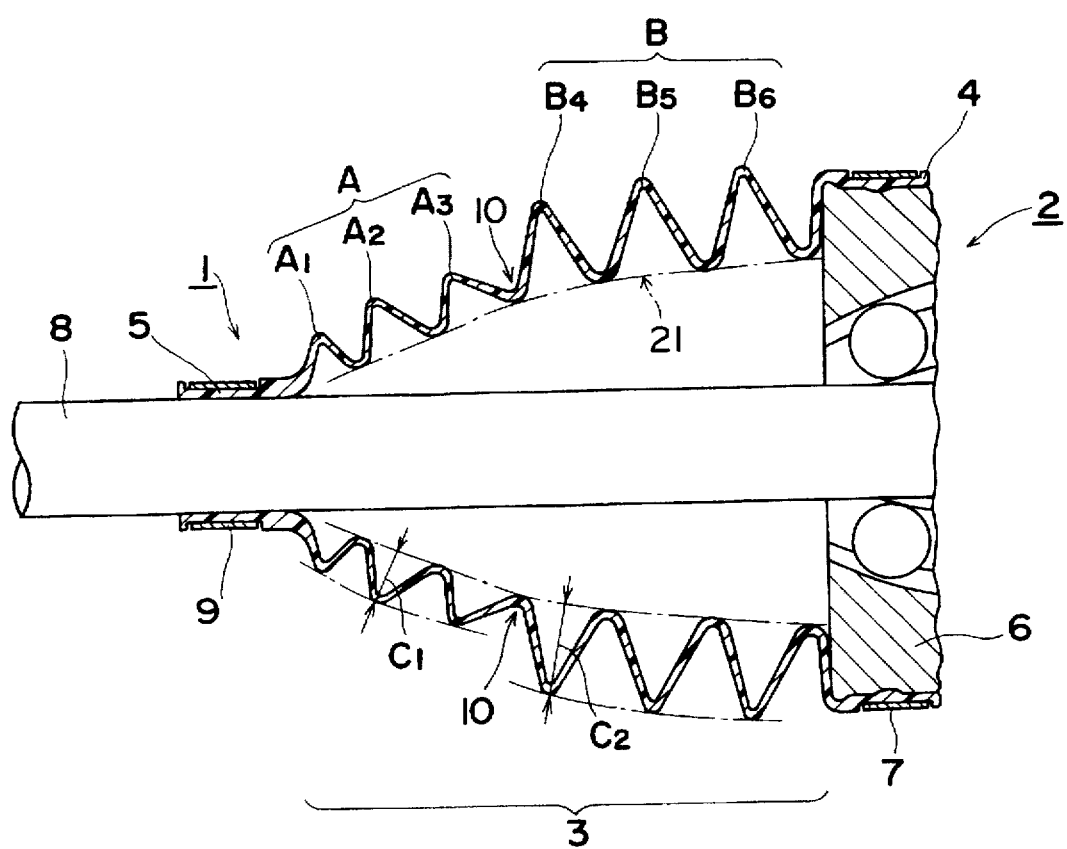
FIG. 13 is a vertical section showing a ninth embodiment of a resin CVJ boot according to the present invention as well as a constant-velocity joint.

The positional relation between the crest groups A and B is not restricted to that shown in FIG. 7 and, for example, as in the embodiment of FIG. 13, the both crest groups A and B may be formed by aligning the positions of the root portions thereof so that the inner circumferential surface of all the root portions of the crest group B closer to the large-diameter mounting portion 4 and the crest group A closer to the small-diameter mounting portion 5 is in contact with one smooth curved (like an orbit described by a artillery shell) inscribed line. Further, as in an embodiment shown in FIG. 14, the diameter of the crown group A may be smaller than that of the crown group B to provide a double-level shape, and the height of crest portions of the crest group A may be greatly different from that of the crest portions of the crest group B.

According to the resin CVJ boot 1 having the above-mentioned arrangement, the following behaviors can be observed in addition to those of the boot of the embodiment shown in FIG. 2.

Namely, when the CVJ boot 1 shows the S-shaped bend as illustrated in FIG. 3, the crest group B closer to the large-diameter mounting portion 4 is compressed in the axial direction while the crest group A closer to the small-diameter mounting portion 5 is conversely developed on the compressed side. At this time, since the difference C1 in diameter between the crest and root portions of the crest portions A1 to A3 belonging to the crest group A closer to the small-diameter mounting portion 5 is made small, the developed length (the length obtained when the crest and root portions are expanded in the axial direction) in the axial direction of the boot is small, and compression of the crest portions B4 to B6 belonging to the crest group B closer to the large-diameter mounting portion 4 can not be encouraged. On the other hand, the crest portions B4 to B6 belonging to the crest group B closer to the large-diameter mounting portion 4 are expanded while the crest portions A1 to A3 belonging to the crest group A closer to the small-diameter mounting portion 5 are conversely compressed on the expanded side. However, since the crest group A closer to the small-diameter mounting portion 5, whose difference in diameters between the crest and root portions is small, has a small quantity of compression, it can not encourage expansion of the crest group B closer to the large-diameter mounting portion 4. Therefore, although the entire boot 1 shows the S-shaped deformation, the slant faces 11 and 13 with the root portion of the bending point therebetween are prevented from coming into contact with each other, and the crest portions B4 to B6 closer to the large-diameter mounting portion 4 are not brought into strong contact with each other. Also, the entire boot is not sharply bent with one radius of curvature, and hence the inner circumferential surface of the crest portions does not come into contact with the rotating shaft 8 of the constant-velocity joint 2.

Figure 8:
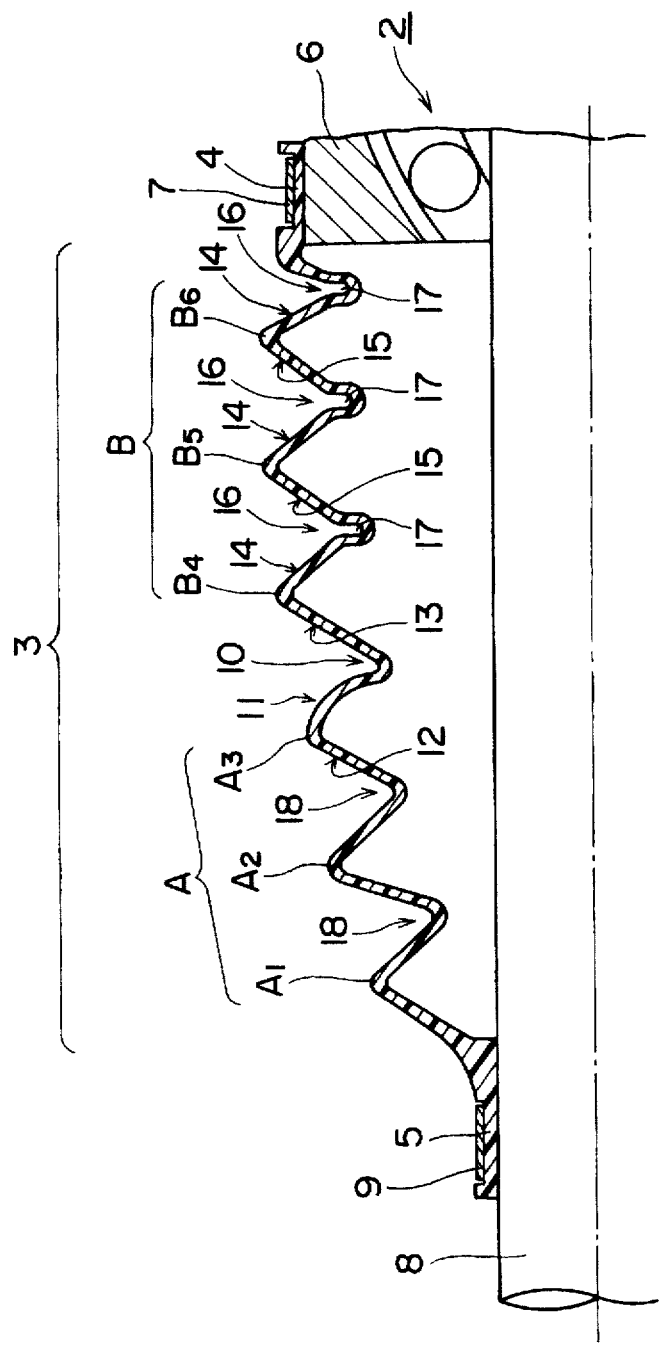
FIG. 8 is a vertical section showing a fourth embodiment of a resin CVJ boot according to the present invention, in which only a half part of the boot, as well as a constant-velocity joint, is shown from a central line.

FIG. 8 shows a fourth embodiment of the resin CVJ boot according to the present invention. In the present invention, U-shaped grooves 17 are further formed in the root portions 16 in the crest group B closer to the large-diameter mounting portion 4 from the S-shaped bending point in the bellows portion 3 and two-tier root portions are constituted by the U-shaped grooves 17 and the V-shaped area thereabove in the resin CVJ boot 1. Since the two-tier root portions 16 have rising portions, the crest portions can be easily developed in the axial direction and deformed, as compared with the case of other root portions 18. Thus, the crest group B closer to the larger-diameter mounting portion 4 is easily deformed as compared with the crest group A closer to the small-diameter mounting portion 5, and deformation of the crest group A closer to the small-diameter mounting portion 5 is difficult. A shape of the root portions in the crest group B closer to the large-diameter mounting portion 4 is different from that of the crest group A closer to the small-diameter mounting portion 5, but there is substantially no distinction in differences in diameters between the crest and root portions and in the thickness between the both crest groups. Incidentally, it is preferable that the crest group A closer to the small-diameter mounting portion has at least two or more substantially-V-shaped root portions 18 having no U-shaped groove 17 in order to reduce the contact pressure between the slant faces 14 and 15 in the crest group B closer to the large-diameter mounting portion. However, it is more preferable that the crest groups A and B are so formed as to have substantially the same number of crest and root portions.

Figure 1:
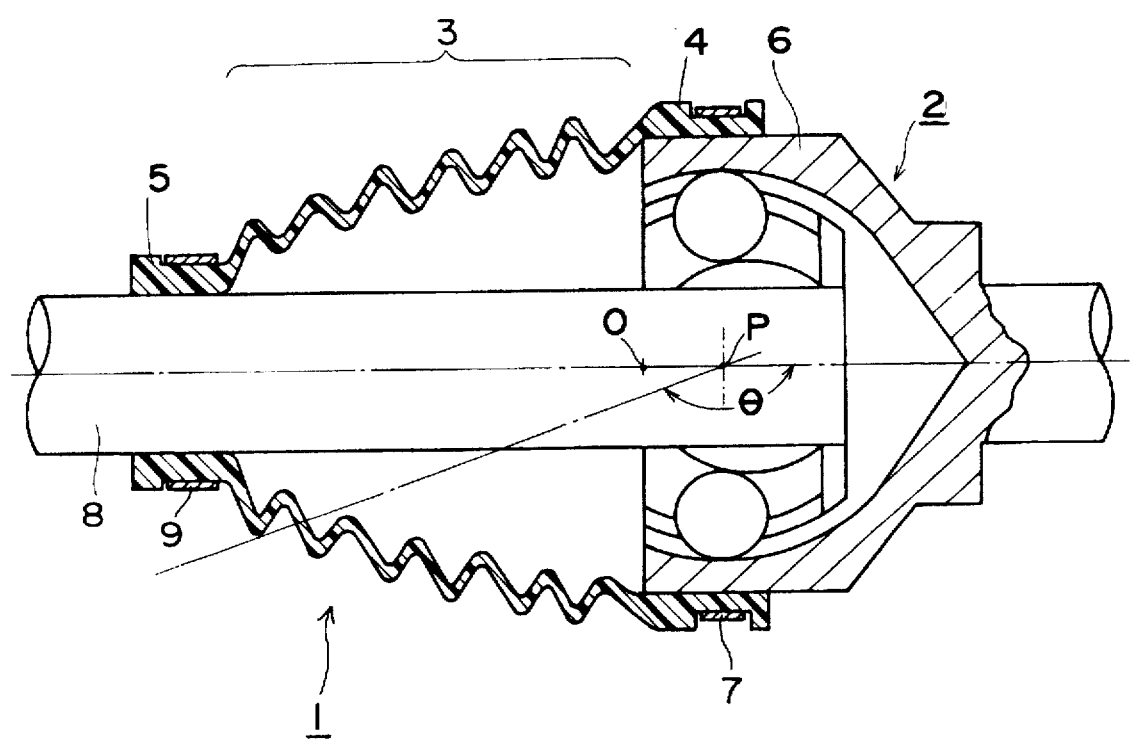
FIG. 1 is a vertical section showing a conventional resin CVJ boot as well as a constant-velocity joint.

According to the resin CVJ boot 1 having the above-described configuration, the following effects can be obtained when the boot 1 shows the S-shaped bend due to the operating angle of the constant-velocity joint in addition to the behaviors of the boot 1 illustrated in FIG. 1.

Namely, the crest portions A1 to A3 closer to the small-diameter mounting portion 5 which rarely show deformation as compared with the crest portions B4 to B6 closer to the large-diameter mounting portion 4 have the small developed length (the length obtained when the crest and root portions are expanded in the axial direction) on the compressed side, and they can not encourage compression of the crest portions B4 to B6 closer to the large-diameter mounting portion 4. On the other hand, the crest portions B4 to B6 closer to the large-diameter mounting portion 4 are expanded and the crest portions A1 to A3 closer to the small-diameter mounting portion 5 are conversely compressed on the expanded side. However, since the developed length is obtained by expansion of the crest portions B4 to B6, which are easily deformed, closer to the large-diameter mounting portion 4, at least the entire boot 1 can be prevented from warping with one small radius of curvature. Thus, although the boot 1 as a whole is deformed in the S shape, the slant faces 11 and 13 having the root portion 10 of the bending point therebetween can be prevented from coming into strong contact with each other and the crest portions B4 to B6 closer to the large-diameter mounting portion 4 are not brought into contact with each other. Further, the entire boot does not display small bend with one radius of curvature, and hence the inner circumferential surface does not come into contact with the rotating shaft 8 of the constant-velocity joint 2.

Figure 9:
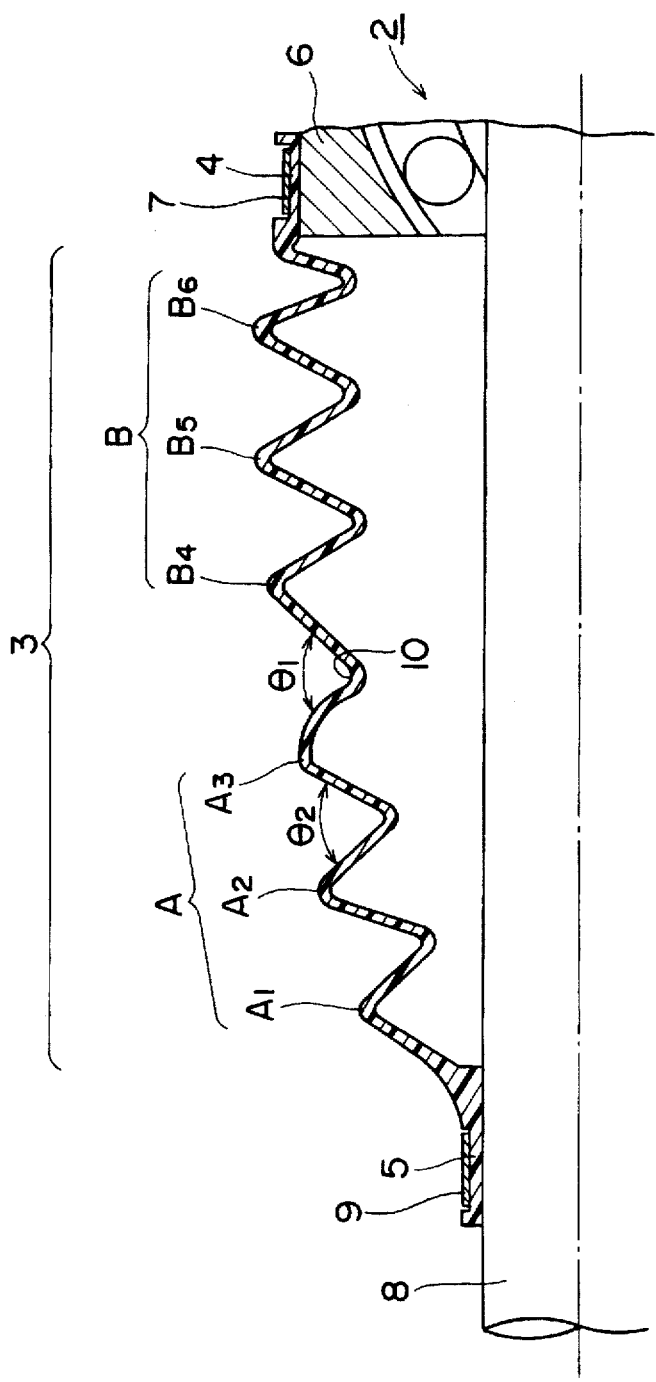
FIG. 9 is a vertical section showing a fifth embodiment of a resin CVJ boot according to the present invention, in which only a half part of the boot, as well as a constant-velocity joint, is shown from a central line.

In addition, it is preferable to reduce or ease compression of the crest group closer to the large-diameter mounting portion on the compressed side by providing large rigidity of the root portion (the root portion of the bending point at the time of S-shaped bend) positioned on the boundary between the crest group A closer to the small-diameter mounting portion and the crest group B closer to the large-diameter mounting portion in the bellows portion 3. FIG. 9 shows a fifth embodiment of the resin CVJ boot according to the present invention, for example. In this resin CVJ boot 1, the large-diameter-mounting-portion-side slant face 11 of the root portion 10 between the crest group B closer to the large-diameter mounting portion 4 and the crest group A closer to the small-diameter mounting portion 5 in the bellows portion 3 is formed so as to have a convex surface, and an opening angle θ1 of the root portion 10 is made larger than an opening angle θ2 of each of other root portions 18 distanced apart from the S-shaped bending point. In this case, rigidity of the large-diameter-mounting-portion-side slant face 11 and the root portion 10 of the bending point can be larger than that of any other slant face and root portion.

In the resin CVJ boot having the above-mentioned configuration, since the opening angle θ1 of the root portion 10 dividing the crest and root portions of the bellows portion 3 in two from the bending point during the S-shaped bend is large and whereby rigidity thereof is large, development of the crest portions A1 to A3 in the crest group A closer to the small-diameter mounting portion 5 can be restricted by the root portion 10 on the compressed side. Accordingly, the developed length of the entire crest group A closer to the small-diameter mounting portion is small, and compression of the crown portions B4 to B6 belonging to the crest group B closer to the large-diameter mounting portion 4 can not be encouraged. On the other hand, since the root portion 10 (which is hard to be deformed) having the opening angle θ1 and rigidity larger than those of any other root portion restricts interference of compression of the crest group A closer to the small-diameter mounting portion 5 with development of the crest group B closer to the large-diameter mounting portion 4 or vice versa on the expanded side, the entire boot 1 can be prevented from warping with one small radius of curvature. Therefore, although the boot i as a whole displays the S-shaped bend, the slant faces 11 and 13 having the root portion 10 of the bending point therebetween can be prevented from coming into strong contact with each other, and the crest portions B4 to B6 closer to the large-diameter mounting portion 4 are not brought into contact with each other strongly. Also the entire boot 1 is not sharply bent with one radius of curvature, and hence the inner circumferential surface can not be brought into contact with the rotating shaft 8 of the constant-velocity joint 2.

Figure 10:
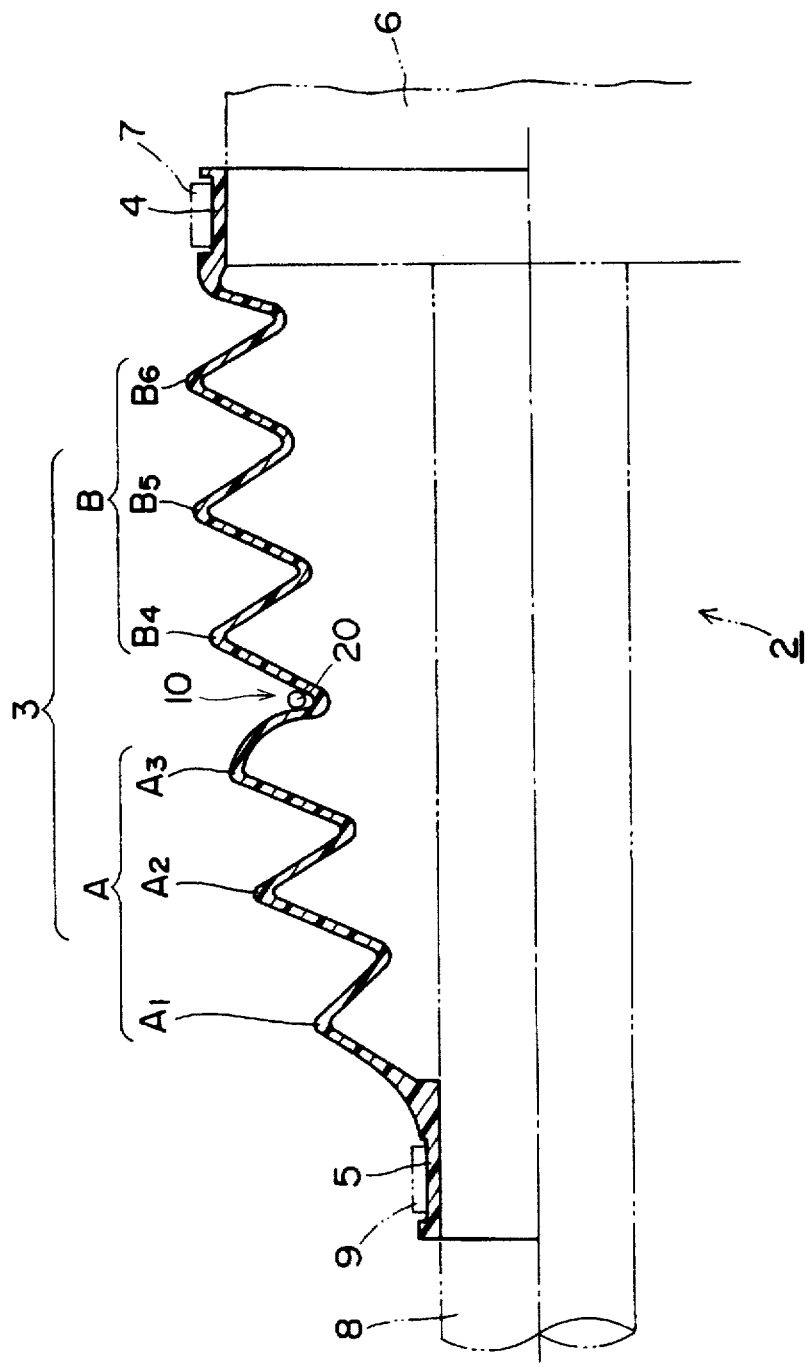
FIG. 10 is a vertical section showing a sixth embodiment of a resin CVJ boot according to the present invention, in which only a half part of the boot, as well as a constant-velocity joint, is shown from a central line.
Figure 11:
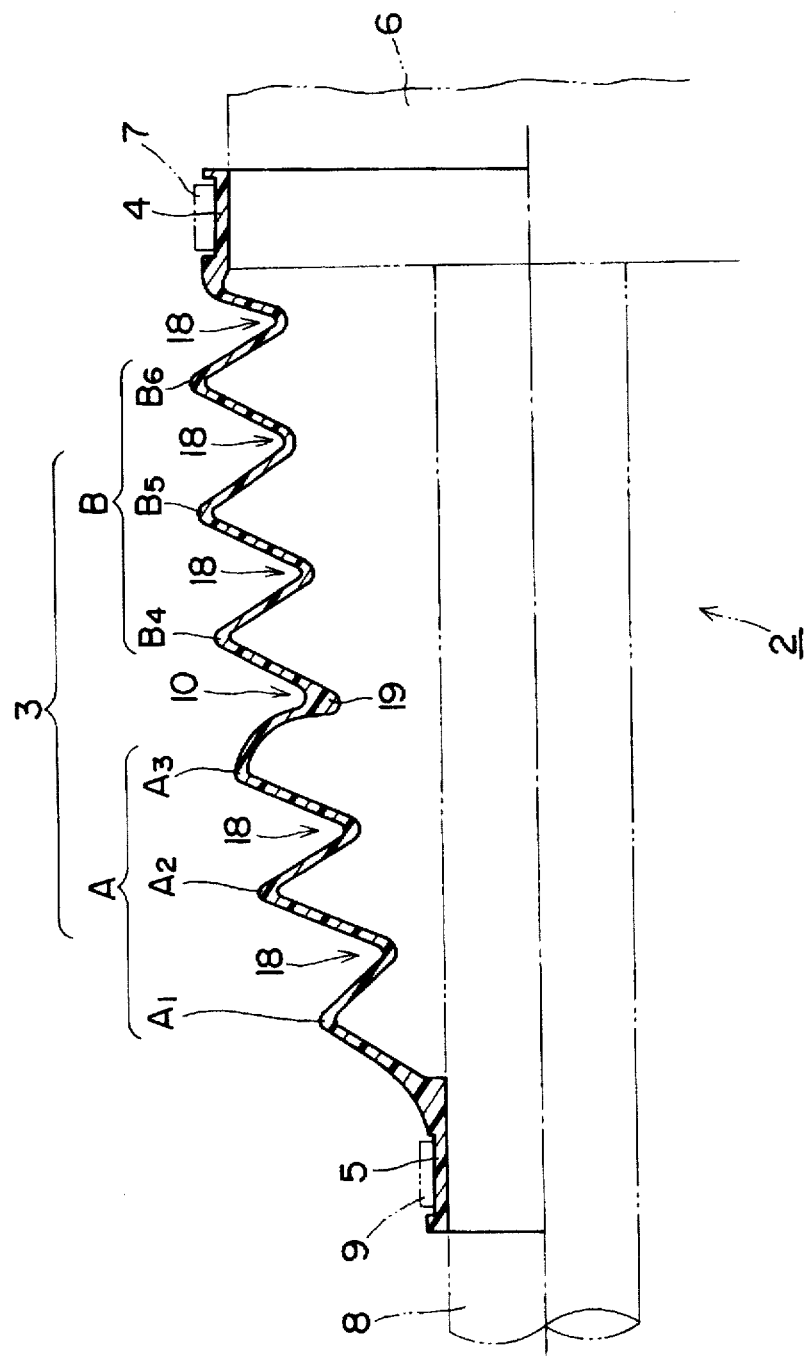
FIG. 11 is a vertical section showing a seventh embodiment of a resin CVJ boot according to the present invention, in which only a half part of the boot, as well as a constant-velocity joint, is shown from a central line.

Further, means for increasing rigidity of the root portion 10 provided on the boundary between the crest group A closer to the small-diameter mounting portion and the crest group B closer to the large-diameter mounting portion in the bellows portion 3 is not restricted to that shown in FIG. 9 and, for example, a thickness 19 of the root portion 10 provided on the boundary between the crest group A closer to the small-diameter mounting portion and the crest group B closer to the large-diameter mounting portion may be larger than that of any other root portion 18 as illustrated in FIG. 11, or a reinforcing member 20 such as a rubber ring may be provided to the root portion 10 on the boundary between the crest group A closer to the small-diameter mounting portion and the crest group B closer to the large-diameter mounting portion as illustrated in FIG. 10. In either case, rigidity of the root portion 10 on the boundary between the crest group A closer to the small-diameter mounting portion and the crest group B closer to the large-diameter mounting portion becomes higher than that of any other root portion 18 (or the U-shaped groove 17) and thereby the root portion 10 is hard to be deformed (hard to be developed), thus obtaining the effects similar to those in the embodiment shown in FIG. 2 as well as further advantages.

Although the foregoing embodiments are preferred examples embodying the present invention, they are not restricted to these types, and various modifications of the above embodiments are possible within the true scope of the present invention, and the respective embodiments shown in FIGS. 6 to 11 may be appropriately combined, or it may be effective to independently realize elements in the respective embodiments as follows.

Figure 12:
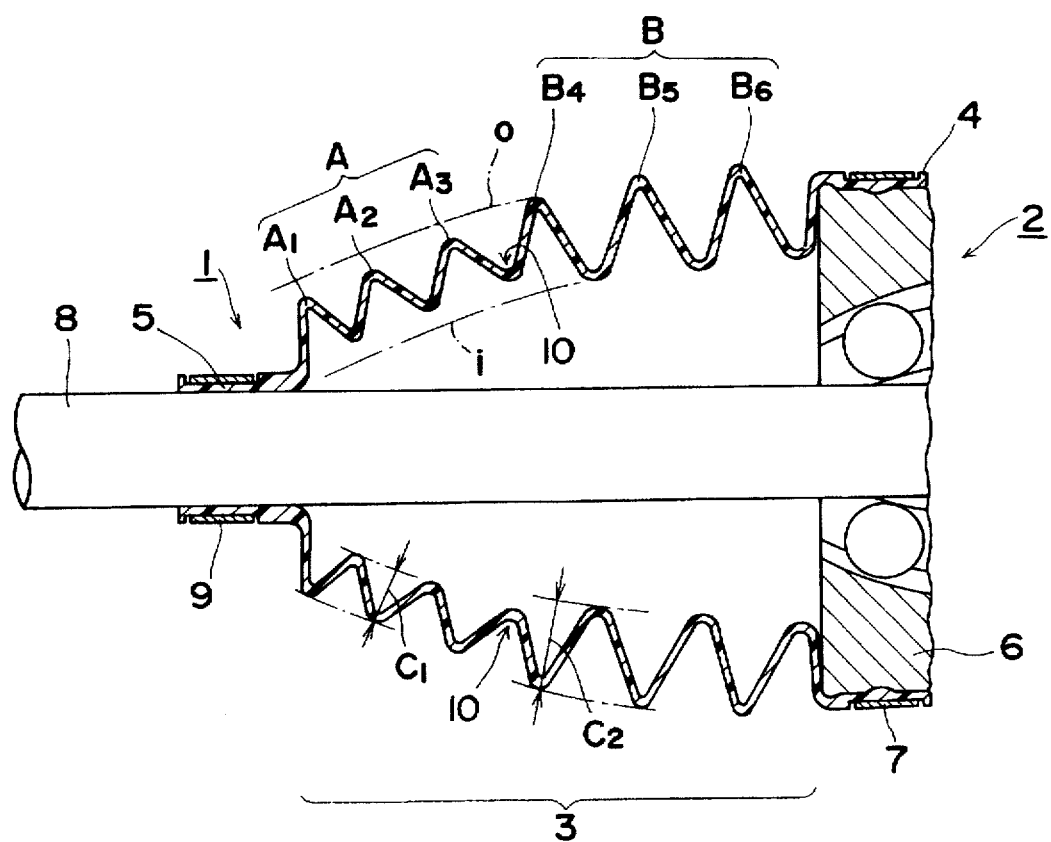
FIG. 12 is a vertical section showing an eighth embodiment of a resin CVJ boot according to the present invention as well as a constant-velocity joint.

For example, FIG. 12 shows an eighth embodiment of the resin CVJ boot according to the present invention. This resin CVJ boot has the bellows portion 3 whose crest portions are roughly divided into a crest group B closer to the large-diameter mounting portion 4 and the other crest group A closer to the small-diameter mounting portion 5 with the root portion 10 of the S-shaped bending point in the center. A large difference is set between the difference C1 in diameter between the crest and root portions of the respective crest portions in the crest group A and the difference C2 of the same of the respective crest portions in the crest group B with the root portion 10 in the center, and the dimensions differ from each other among the crest portions belonging to the same crest group. Further, the largest one among differences C1 in diameter between the crest and root portions in the crest group A closer to the small-diameter mounting portion 5 is made smaller than the smallest one among the differences C2 in diameter between the crest and root portions in the crest group B closer to the large-diameter mounting portion 4. It is needless to say that all the crest portions belonging to the same crest group can be so set as to have the same difference in diameter between the crest and root portions. In this example, the root portion 10 between the crest group B closer to the large-diameter mounting portion 4 from the bending point obtained when the bellows portion 3 shows the S-shaped bend and the crest group A closer to the small-diameter mount portion 5 from the same is determined as a boundary between the differences C1 and C2 in diameter between the crest and root portions. The root portion 10 equally divides a number of crest portions in the bellows in two. However, a number of crest portions in the crest group A does not have to be the same with that in the crest group B, and it is possible to make a distinguish in the two differences in diameter between the crest and root portions at a position apart from the central point in the bellows portion 3, namely, make a difference between a number of crest portions of the crest group A and that of the crest group B.

Figure 14:
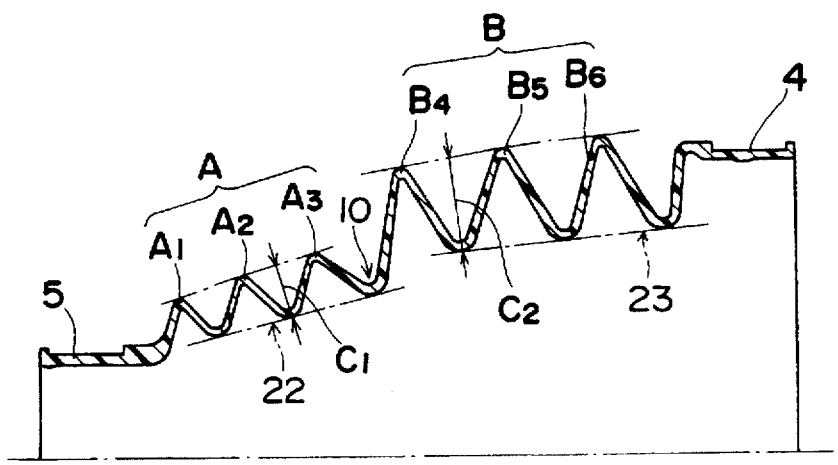
FIG. 14 is a vertical section showing a tenth embodiment of a resin CVJ boot according to the present invention.

Here, each crest portion of the crest group A is so provided as to be positioned between the crest portions and the root portions in the crest group B. Namely, the crest and root portions of the crest group A are provided between the position of the inner diameter (represented by a line i) of the root portions and the position of the outer diameter (represented by a line o) of the crest portions of the crest group B, these positions being assumed at the position of the crest group A. The positional relation in crests between the crest group A and the crest group B is not restricted to that shown in FIG. 12 and, for example, as shown in FIG. 13, the both crest groups A and B may be formed in such a manner that the inner circumferential surface of all the root portions in the crest group B closer to the large-diameter mounting portion 4 and those in the crest group A closer to the small-diameter mounting portion 5 are in contact with one smooth curved (like an orbit described by an artillery shell) inscribed line 21. Further, as shown in FIG. 14, an inscribe line 22 of the crest group A closer to the small-diameter mounting portion 4 and an inscribed line 23 of the crest group B closer to the large-diameter mounting portion 5 may be non-continuously formed to provide a double-level configuration, and the height of the crests in the crest group A may be greatly different from that of the crests in the crest group B. In this case, a difference C1 in diameter between the crest and root portions in the crest group A closer to the small-diameter mounting portion 4 largely differs from a difference C2 in diameter between the crest and root portions in the crest group B closer to the large-diameter mounting portion 5.

Figure 15:
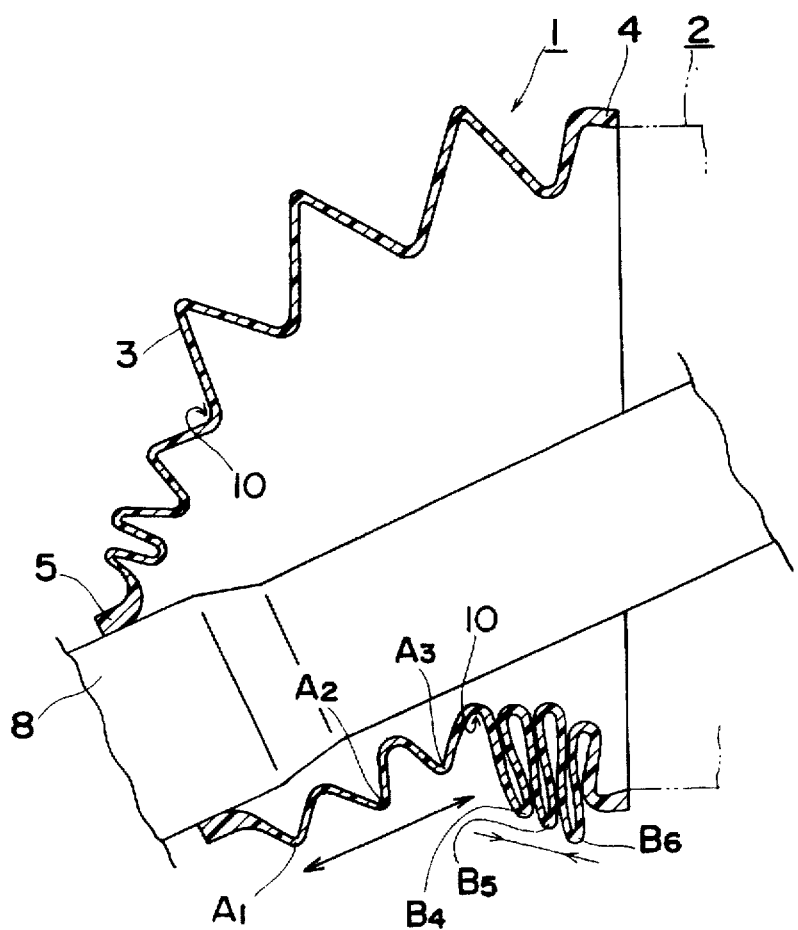
FIG. 15 is an explanatory view showing a deformed state of the boot illustrated in FIG. 13 when the constant-velocity joint has an operating angle.

According to the resin CVJ boot having the above-mentioned configuration, when the CVJ boot is bent due to an operating angle of the constant-velocity joint as shown in FIG. 15, the crest portions B4 to B6 belonging to the crest group B closer to the large-diameter mounting portion 4 are compressed in the axial direction and the crest portions A1 to A3 belonging to the crest group A closer to the small-diameter mounting portion 5 are conversely developed on the compressed side. In this case, since a difference C1 in diameter between the crest and root portions of the crest portions A1 to A3 belonging to the crest group A closer to the small-diameter mounting portion 5 is made small, the developed length (the length obtained when the crest portions are expanded in the axial direction) is short, and compression of the crest portions B4 to B6 belonging to the crest group B closer to the large-diameter mounting portion 4 is not encouraged.

On the other hand, the crest portions B4 to B6 belonging to the crest group B closer to the large-diameter mounting group 4 are expanded and the crest portions A1 to A3 belonging to the crest group A closer to the small-diameter mounting portion 5 are conversely compressed on the expanded side. However, development of the crest group B which is to be expanded is absorbed to some extent by compression of the crest group A, whose difference in diameter between the crest and root portions is small, closer to the small-diameter mounting portion 5, thus preventing at least the entire boot from being warped with one small radius of curvature. Therefore, although the entire boot shows the S-shaped deformation, the crest portions B4 to B6 closer to the large-diameter mounting portion 4 are not brought into strong contact with each other and the entire boot does not display sharp bend with one radius of curvature, and hence the inner circumferential surface does not come into contact with the rotating shaft 8 of the constant-velocity joint 2.

Figure 16:
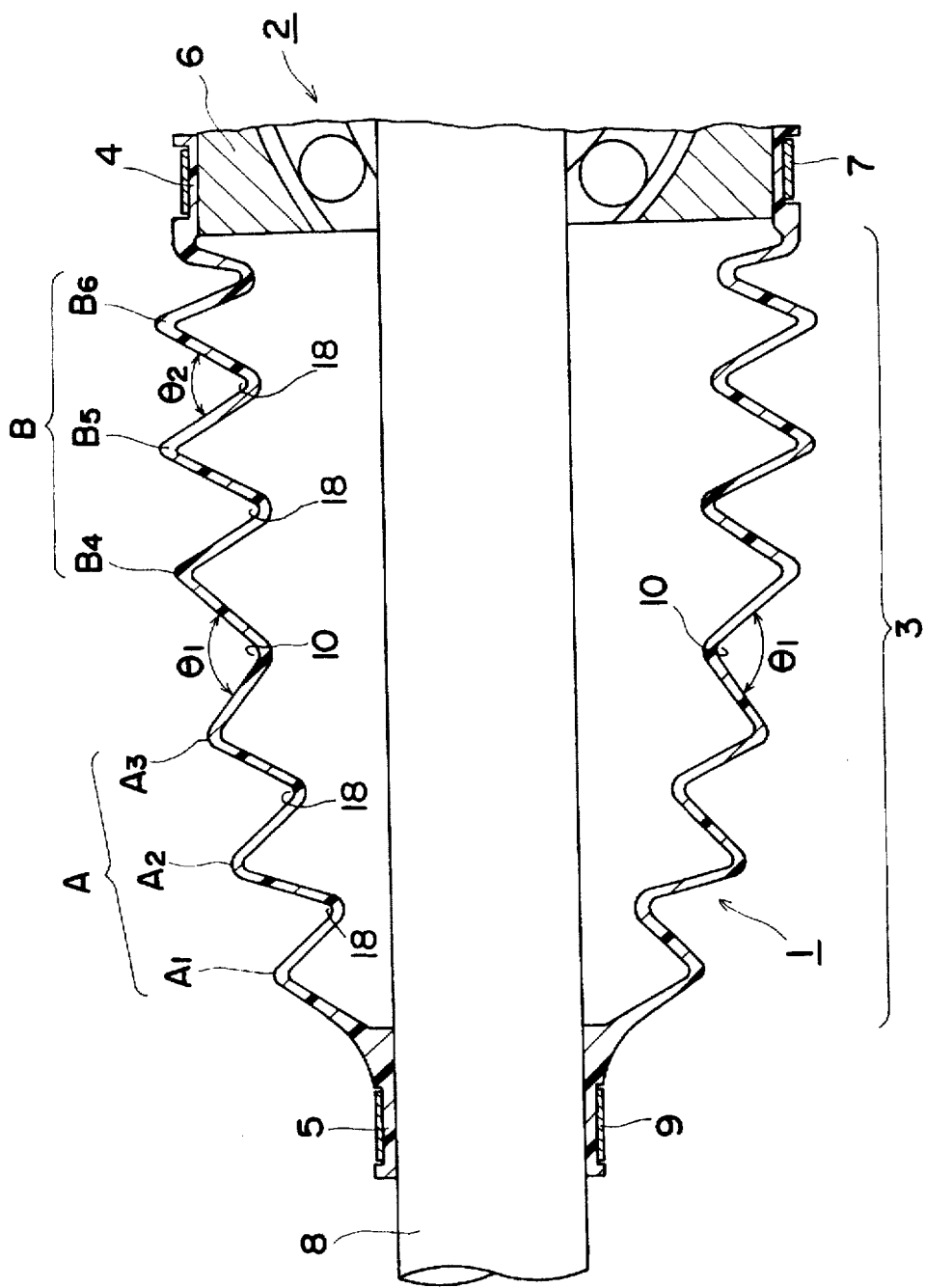
FIG. 16 is a vertical section showing an eleventh embodiment of a resin CVJ boot according to the present invention as well as a constant-velocity joint.
Figure 19:
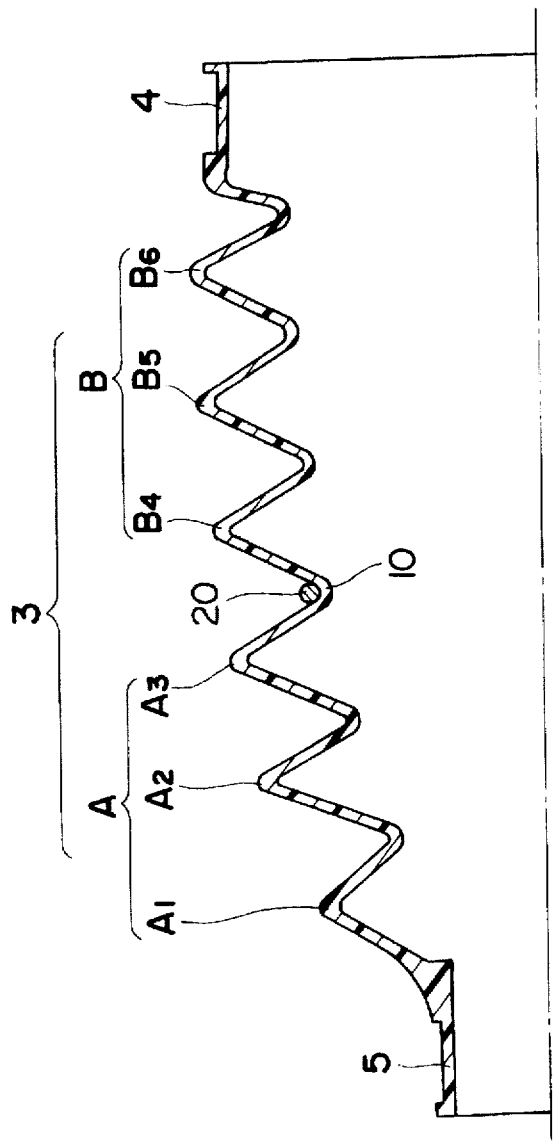
FIG. 19 is a thirteenth embodiment of a resin CVJ boot according to the present invention, in which only a half part of the boot is shown from a central line.

Further, FIGS. 16 and 19 show still other embodiments of the resin CVJ boot according to the present invention. In this resin CVJ boot, development of the crest group closer to the small-diameter mounting portion on the compressed side of the boot can be restricted by increasing rigidity of the root portion 10 of the bending point to be higher than that of any other root portion 18 distanced apart from the S-shaped bending point, and at least contact made among crest portions in the crest group closer to the large-diameter mounting portion is reduced, thereby enhancing durability of the boot.

In an eleventh embodiment shown in FIG. 16, the crest group B closer to the large-diameter mounting portion and the crest group A closer to the small-diameter mounting portion are divided with the root portion 10 (the root portion between the third crest portion A3 and the fourth crest portion B4) of the bending point, at which a number of crest portions is equally divided in two, on the boundary. Rigidity of the root portion 10 is made larger than that of any other root portion 18 by forming an opening angle η1 of the root portion 10 larger than an opening angle θ2 of any other root portion 18. Incidentally, in this embodiment, although a number of crest portions in the bellows portion 3 is equally divided in two by the root portion 10 of the bending point, a number of crest portions in the crest group A does not have to be equal to that of crest portions in the crest group B, and it is possible to increase rigidity of the root portion provided at portion distanced apart from an intermediate point in the bellows portion 3 to be higher than that of any other root portion, i.e., a number of crest portions in the crest group A may differ from that of crest portions in the crest group B.

Figure 17:
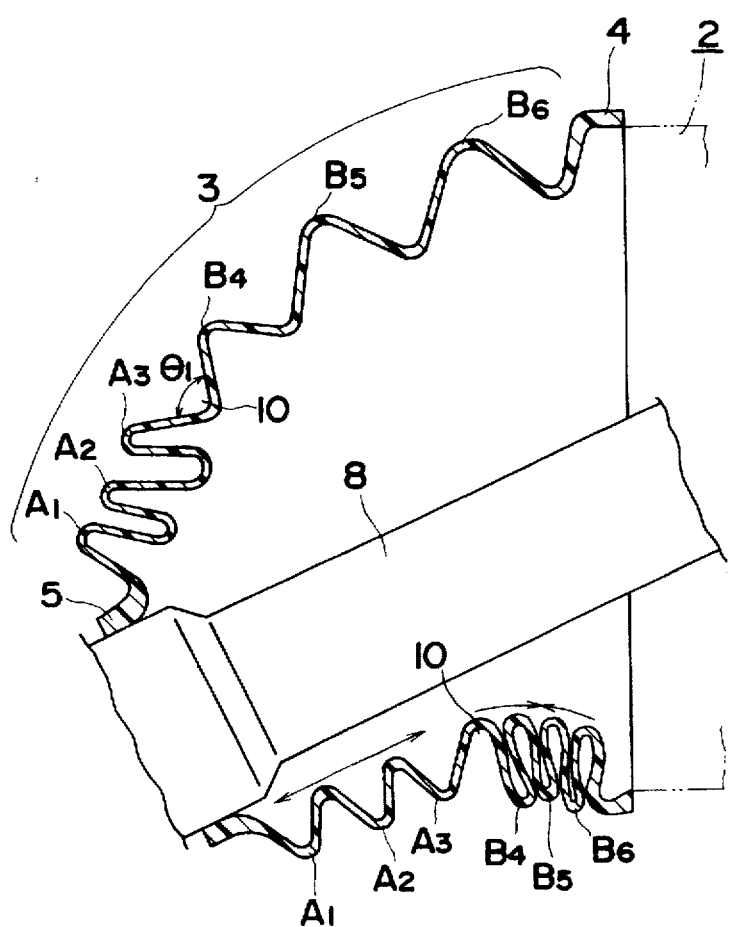
FIG. 17 is an explanatory view showing a deformed state of the boot illustrated in FIG. 16 when the constant-velocity joint has an operating angle.

According to the resin CVJ boot having the above configuration, when the CVJ boot is bent as shown in FIG. 17, the crest portions B4 to B6 belonging to the crest group B closer to the large-diameter mounting portion 4 are compressed in the axial direction and the crest portions A1 to A3 belonging to the crest group A closer to the small-diameter mounting portion 5 are conversely developed on the compressed side. At this time, since the root portion 10 provided in the middle of the bellows portion 3 has a large opening angle θ1 and increased rigidity development (opening of angles of the crest portions to which the force is applied in the stretching direction) of the crest portions A1 to A3 in the crest group A closer to the small-diameter mounting portion 5 is restricted by the root portion 10. Accordingly, the developed length (the length obtained when the crest portions are expanded in the axial direction) of the entire crest group A closer to the small-diameter mounting portion is short, and compression of the crest portions B4 to B6 belonging to the crest group B closer to the large-diameter mounting portion 4 is not encouraged.

On the other hand, the crest portions B4 to B6 belonging to the crest group B closer to the large-diameter mounting portion 4 are expanded while the crest portions A1 to A3 belonging to the crest group A closer to the small-diameter mounting portion 5 are conversely compressed on the expanded side. However, since the root portion 10 having a larger opening angle θ1 and higher rigidity (it is hardly deformed) than those of any other root portion suppress the interference of compression of the crest group A closer to the small-diameter mounting portion 5 with development of the crest group B closer to the large-diameter mounting portion 4, the entire boot can be prevented from being warped with one small radius of curvature. Therefore, although the boot as a whole shows the S-shaped deformation, the crest portions B4 to B6 closer to the large-diameter mounting portion 4 do not come into strong contact with each other and the entire boot do not display sharp bend with one radius of curvature, whereby the inner circumferential surface does not come into contact with the rotating shaft 8 of the constant-velocity joint 2.

Figure 18:
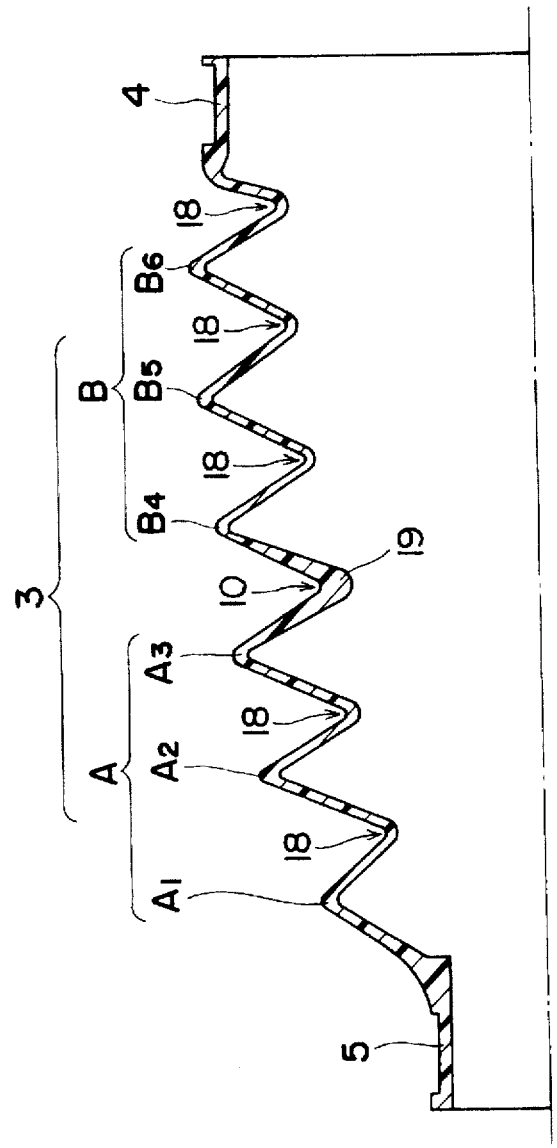
FIG. 18 is a vertical section showing a twelfth embodiment of a resin CVJ boot according to the present invention, in which only a half part of the boot is shown from a central line.

Incidentally, as a measure for increasing rigidity of the root portion 10 of the boot, a thickness 19 of the root portion 10 provided between the crest group A closer to the small-diameter mounting portion and the crest group B closer to the large-diameter mounting portion may be so formed as to be large, for example, as in the twelfth embodiment shown in FIG. 18, or a reinforcing member 20 such as a rubber ring may be provided to the root portion 10 between the crest group A closer to the small-diameter mounting portion and the crest group B closer to the large-diameter mounting portion as in the thirteenth embodiment shown in FIG. 19. In either case, rigidity of the root portion 10 is increased to be higher than that of any other root portion 18 and the root portion 10 becomes hard to be deformed (hard to be developed), and hence effects and advantages similar to those in the embodiment shown in FIG. 16 can be obtained.

Further, FIGS. 20 to 23 show still further embodiments of the resin CVJ boot according to the present invention. In these embodiments, a series of crest and root portions closer to the large-diameter mounting portion are so made as to be easily deformed as compared with a series of crest and root portions closer to the small-diameter mounting portion by providing U-shaped grooves to the root portions closer to the large-diameter mounting portions except the root portions in the vicinity of the small-diameter mounting portion and, even though the constant-velocity joint has a large operating angle, the developed length of the series of crest and root portions closer to the small-diameter mounting portion is reduced on the compressed side so that at least the crest portions in the series of crest and root portions closer to the large-diameter mounting portion can be prevented from being compressed, thus increasing durability of the boot by reducing the contact pressure in these crest portions. For example, as in a fourteenth embodiment shown in FIG. 20, in the resin CVJ boot 1, U-shaped grooves 17 are formed in the root portions 16 in the crest group B closer to the large-diameter mounting portion 4 from the root portion 10 of the bending point, and each two-tier root portion is constituted by the U-shaped groove 17 and the V-shaped root portion 16 provided thereabove. Since the two-tier root portion having the U-shaped groove 17 has a rising portion, it further facilitates development of crest portions in the axial direction and easily provokes deformation, as compared with any other root portion 18 including the root portion 10 of the bending point 10. Therefore, the crest group B closer to the large-diameter mounting portion 4 is easily deformed as compared with the crest group A closer to the small-diameter mounting portion 5, and the crest group A closer to the small-diameter mounting portion 5 is hard to be deformed. The crest group B closer to the large-diameter mounting portion 4 is only different in the shape of the root portions from the crest group A closer to the small-diameter mounting portion 5, and the both groups are substantially equal to each other in a difference C in diameter between the crest and root portions and a thickness. Incidentally, it may be preferable that the crest group A closer to the small-diameter mounting portion has at least two or more root portions 18 including the root portion 10 of the bending point in order to reduce the contact pressure of the crest portions closer to the large-diameter mounting portion, and more preferably, both the crest group A and the crest group B may be so formed as to have the same number of crest and root portions.

Figure 21:
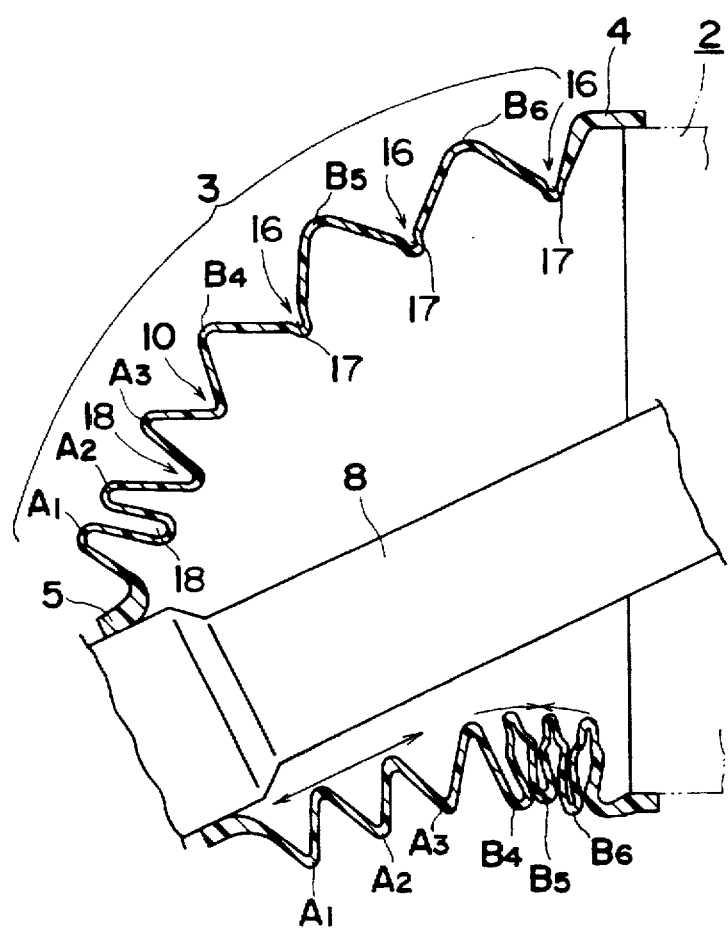
FIG. 21 is an explanatory view showing a deformed state of the boot illustrated in FIG. 20 when the constant-velocity joint has an operating angle.

According to the resin CVJ boot 1 having the above-described configuration, when the boot 1 is bent by imparting an operating angle to the constant-velocity joint 2 as shown in FIG. 21, the crest portions B4 to B6 belonging to the crest group B closer to the large-diameter mounting portion 4 are compressed in the axial direction while the crest portions A1 to A3 belonging to the crest group A closer to the small-diameter mounting portion 5 are conversely developed on the compressed side. At this time, the crest portions A1 to A3 closer to the small-diameter mounting portion 5, which are hard to be deformed as compared with the crest portions B4 to B6 closer to the large-diameter mounting portion 4, have a short developed length (the length obtained when the crest portions are expanded in the axial direction) which does not encourage compression of the crest portions B4 to B6 closer to the large-diameter mounting portion 4.

On the other hand, the crest portions B4 to B6 closer to the large-diameter mounting portion 4 are expanded while the crest portions A1 to A3 closer to the small-diameter mounting portion 5 are conversely compressed on the expanded side. However, since the developed length is obtained by expanding the crest portions B4 to B6 closer to the large-diameter mounting portion 4 which are easy to be deformed, at least the entire boot 1 is prevented from being sharply bent with one small radius of curvature. Therefore, the entire boot 1 shows the S-shaped deformation, but the crest portions B4 to B6 closer to the large-diameter mounting portion 4 are not brought into strong contact with each other and the entire boot 1 is not sharply bent with one small radius of curvature, whereby the inner circumferential surface does not come in contact with the rotating shaft 8 of the constant-velocity joint 2.

Figure 22:
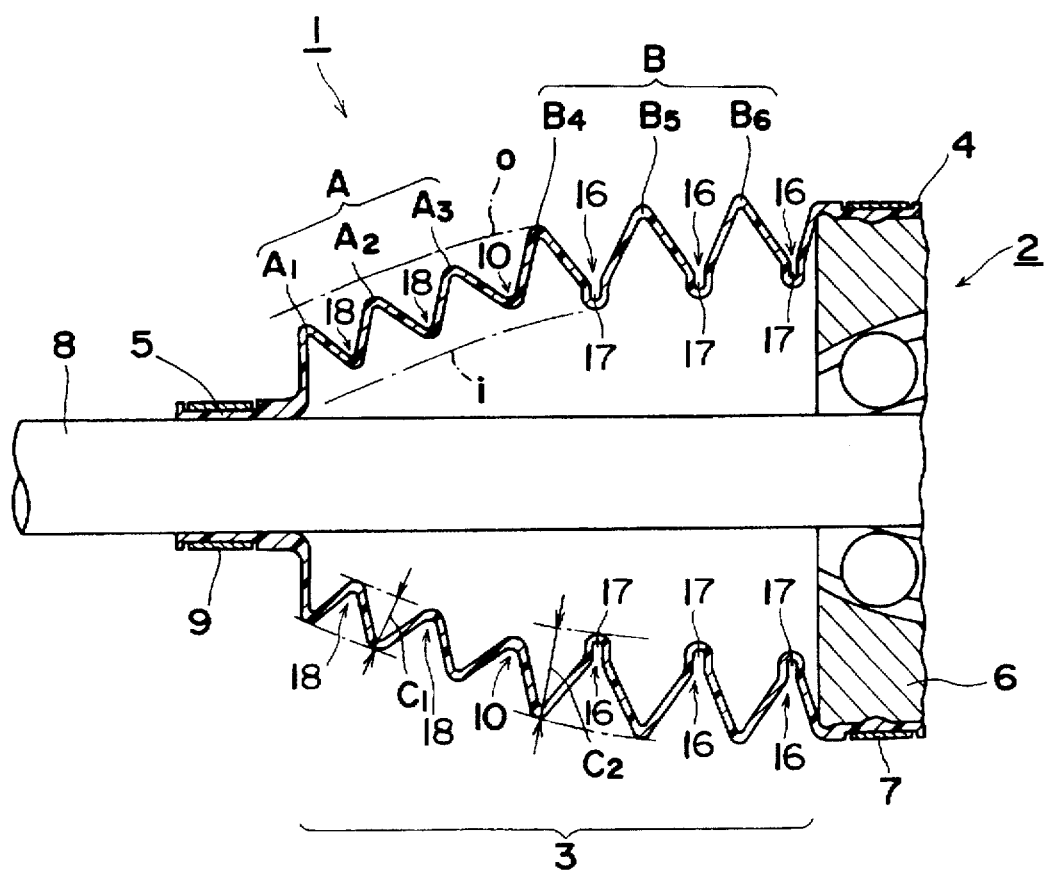
FIG. 22 is a vertical section showing a fifteenth embodiment of a resin CVJ boot according to the present invention as well as a constant-velocity joint.

Next, FIG. 22 illustrates a fifteenth embodiment according to the present invention. In this embodiment, a difference C1 in diameter between the crest and root portions in each of the crest portions A1 to A3 belonging to the crest group A which is closer to the small-diameter mounting portion from the root portion 10 and has no U-shaped groove 18 is set smaller than a difference C2 in diameter between the crest and root portions in each of the crest portions B4 to B6 belonging to the crest group B which is closer to the large-diameter mounting portion from the root portion 10 and has U-shaped grooves 18 provided thereto. Of course, these differences may be or may not be the same among the crest portions belonging to the same crest group to some extent. Therefore, the largest one among differences C1 in diameter between the crest and root portions in the crest group A closer to the small-diameter mounting portion 5 is made smaller than the smallest one among differences C2 in diameter between the crest and root portions in the crest group B closer to the large-diameter mounting portion 4. Naturally, it may also be possible to equally determine the differences in diameter between the crest and root portions in all the crest portions belonging to the same crest group.

In this example, the root portion 10 between the crest group B closer to the large-diameter mounting portion from the S-shaped bending point and the crest group A closer to the small-diameter mounting portion from the S-shaped bending point functions is a boundary between the large and small differences C1 and C2. This root portion 10 equally divides a number of crest portions in the bellows portion in two. It is, however, unnecessary to so set the number of crest portions in the crest group A as to be equal to that of crest portions in the crest group B, and it may be possible to make a distinction in these differences in diameter between the crest and root portions at a position distanced apart from the intermediate point in the bellows portion 3 depending on the situation, namely, the number of crest portions in the crest group A may differ from that of crest portions in the crest group B. Here, the respective crest portions in the crest group A are provided between the crest portions and the root portions in the crest group B. In other words, the crest and root portions in the crest group A are provided between a position of an inner diameter (represented by a line i) of the root portions and a position of an outer diameter (represented by a line o) of the crest portions in the crest group B, these positions being assumed at the position of the crest group A.

As described in the eighth embodiment, the positional relation between the crest group A and the crest group B is not restricted to that shown in FIG. 22, and structure shown in, for example, FIG. 13 or FIG. 14 may be possible, or the diameter of the crest group A may be smaller than that of the crest group B to provide a double-level configuration and a height of the crest portions in the crest group A may largely differ from that of the crest portions in the crest group B.

Figure 20:
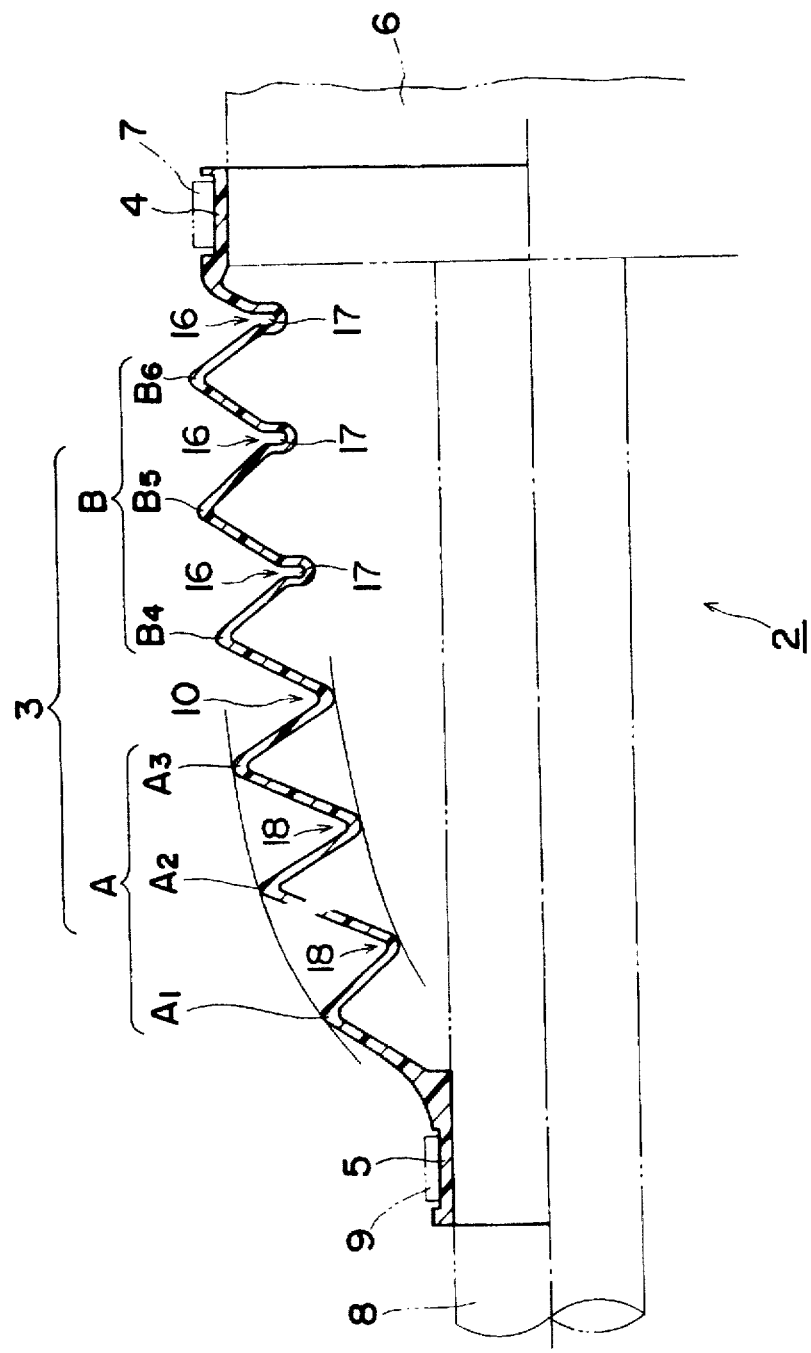
FIG. 20 is a vertical section showing a fourteenth embodiment of a resin CVJ boot according to the present invention as well as a constant-velocity joint, in which only a half part of the boot is shown from a central line.

According to the resin CVJ boot 1 having the above-mentioned structure, the following behaviors are observed in addition to those of the boot in the embodiment shown in FIG. 20.

Namely, when the CVJ boot 1 is bent due to an operating angle of the constant-velocity joint as shown in FIG. 21, the crest group B closer to the large-diameter mounting portion 4 is compressed in the axial direction while the crest group A closer to the small-diameter mounting portion 5 are conversely developed on the compressed side. At this time, since differences C1 in diameter between the crest and root portions of the crest portions A1 to A3 belonging to the crest group A closer to the small-diameter mounting portion 5 are made small, the developed length (the length obtained when the crest portions are expanded in the axial direction) of these crest portions is small, and compression of the crest portions B4 to B6 belonging to the crest group B closer to the large-diameter mounting portion 4 is not thereby encouraged. On the other hand, the crest portions B4 to B6 belonging to the crest group B closer to the large-diameter mounting portion 4 are expanded while the crest portions A1 to A3 belonging to the crest group A closer to the small-diameter mounting portion 5 are conversely compressed on the expanded side. However, development of the crest group B to be expanded is absorbed to some extent by compression of the crest group A, which has smaller differences in diameter between the crest and root portions, closer to the small-diameter mounting portion 5, thus preventing at least warpage of the entire boot 1 with one small radius of curvature. Consequently, although the boot 1 as a whole displays the S-shaped deformation, the crest portions B4 to B6 closer to the large-diameter mounting portion 4 are not brought into strong contact with each other and the entire boot is not sharply bent with one radius of curvature, whereby the inner circumferential surface does not come into contact with the rotating shaft 8 of the constant-velocity joint 2.

Figure 23:
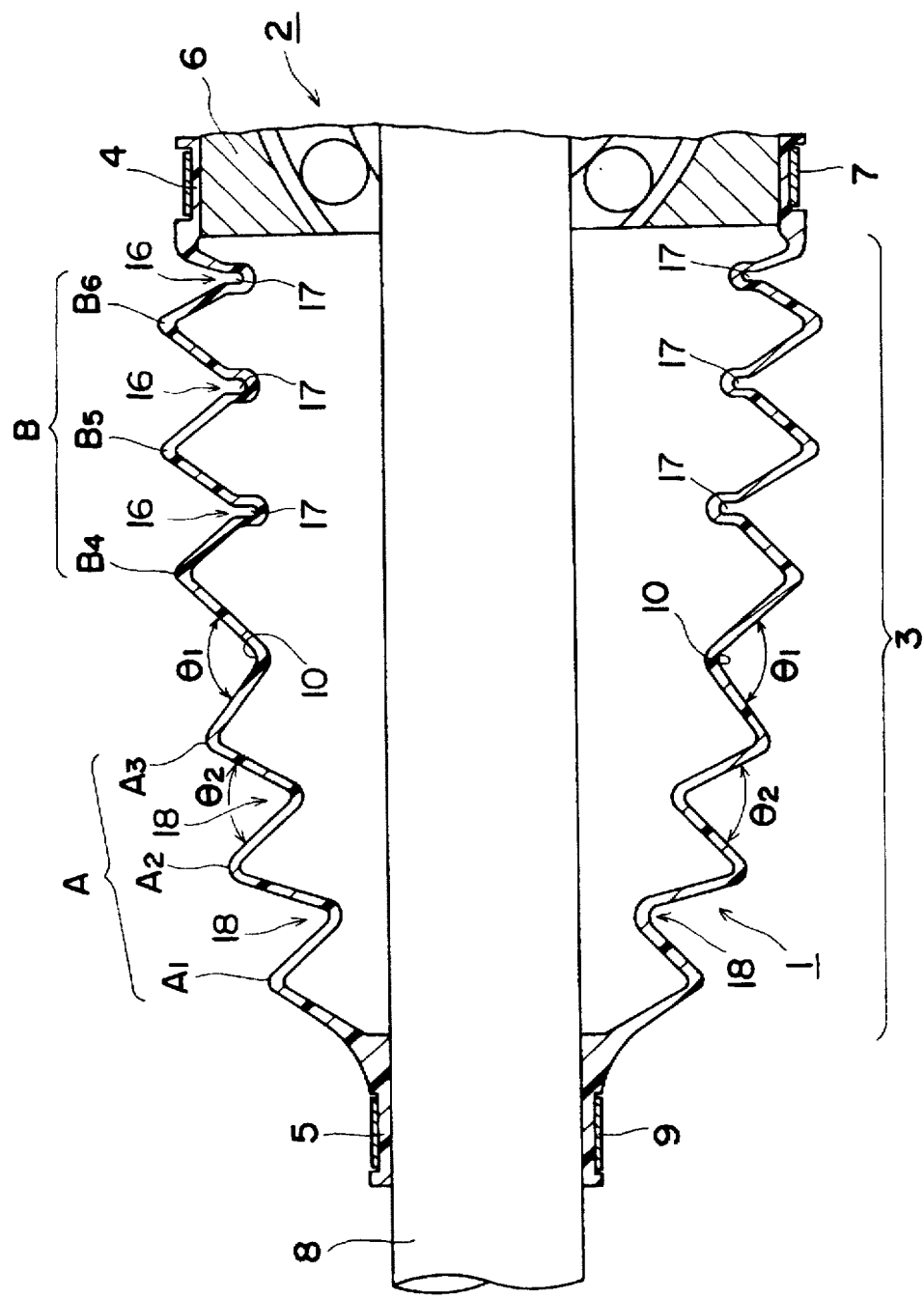
FIG. 23 is a vertical section showing a sixteenth embodiment of a resin CVJ boot according to the present invention as well as a constant-velocity joint.

FIG. 23 shows a sixteenth embodiment of the resin CVJ boot according to the present invention. In the bellows portion 3 of this resin CVJ boot 1, rigidity of the root portion 10 provided on the boundary between the crest group B closer to the large-diameter mounting portion 4 from the S-shaped bending point and the crest group A closer to the small-diameter mounting portion 5 from the bending point is increased to be higher than that of any other root portion by making the opening angle θ1 of the root portion 10 larger than the opening angle θ2 of any other root portion 18 or 16. Incidentally, a number of crest portions of the crest group A does not have to be equal to that of the crest group B, and it may be possible to increase rigidity of the root portion distanced apart from the intermediate point in the bellows portion 3 to be higher than that of any other root portion, i.e., make a difference between a number of crest portions of the crest group A and that of the crest group B depending on the situation.

In the resin CVJ boot having the above-described structure, since the root portion 10 provided at the intermediate point in the bellows portion 3 has the larger opening angle θ1 and the increased rigidity as similar to the boot 1 in the embodiment shown in FIG. 20, development of the crest portions A1 to A3 in the crest group A closer to the small-diameter mounting portion 5 can be restricted by the root portion 10 on the compressed side. Therefore, the developed length of the entire crest group A closer to the small-diameter mounting portion is short, and compression of the crest portions B4 to B6 belonging to the crest group B closer to the large-diameter mounting portion 4 is not encouraged. On the other hand, since interference of compression of the crest group A closer to the small-diameter mounting portion 5 with development of the crest group B closer to the large-diameter mounting portion 4 or vice versa is restricted by the root portion 10 having the larger opening angle θ1 and rigidity (it is hard to be deformed) than those of any other root portion on the expanded side, the entire boot 1 can be prevented from being warped with one small radius of curvature. Accordingly, although the entire boot 1 displays the S-shaped deformation, the crest portions B4 to B6 closer to the large-diameter mounting portion 4 do not come into strong contact with each other and the entire boot does not show sharp bend with one radius of curvature, thereby making no contact between the inner circumferential surface and the rotating shaft 8 of the constant-velocity joint 2.

For example, as means for increasing rigidity of the root portion 10 provided on the boundary between the crest group A closer to the small-diameter mounting portion and the crest group B closer to the large-diameter mounting portion in the bellows portion 3, it is not restricted to that shown in FIG. 22 and, a thickness 19 of the root portion 10 may be larger than that of any other root portion 18 or 16 as illustrated in FIG. 18, or a reinforcing member 20 such as a rubber ring may be provided to the root portion 10 as shown in FIG. 19. In either case, rigidity of the root portion 10 can be further increased as compared with that of any other root portion 18 or 16 or that of the U-shaped groove 18 and the root portion 10 becomes hard to be deformed (hard to be developed), thus obtaining the effects similar to those in the embodiment shown in FIG. 19 and further enhanced advantages.

What is claimed is:

1. In a resin CVJ boot containing a shaft and comprising a bellows portion consisting of four or more continuous crest and root portions, a large-diameter mounting portion provided at one end of the bellows portion and a small-diameter mounting portion provided at the other end of the bellows portion, the resin CVJ boot characterized in that the CVJ boot has a large crest group and a small crest group and means for distinguishing said large crest group closer to the large-diameter mounting portion from a bending point obtained when the bellows portion displays an S-shaped bend having an expanded side and a compressed side from said small crest group directly connected to the large crest group and being closer to the small-diameter mounting portion, and for preventing slant faces forming the root portion which is closest to the S-shaped bend, from coming into contact with each other on said compressed side and, in the event that the slant faces do come into contact with each other on said compressed side, causing the slant faces to contact each other over a broad contact area, the large crest group being directly connected to the small crest group at the root portion closest to the S-shaped bend, the crest groups being shaped so that no root portion comes into contact with the shaft when the bellows portion displays the S-shaped bend.

2. A resin CVJ boot according to claim 1 wherein the means comprise the rigidity of the root portion closest to the S-shaped bend being higher than the rigidity of any other root portion in the boot.

3. A resin CVJ boot according to claim 2, wherein an opening angle of the root portion between the crest group closer to the small-diameter mounting portion and the crest group closer to the large-diameter mounting portion is larger than an opening angle of any other root portion.

4. A resin CVJ boot according to claim 2, wherein a thickness of the root portion between the crest group closer to the small-diameter mounting portion and the crest group closer to the large-diameter mounting portion is larger than a thickness of any other root portion.

5. A resin CVJ boot according to claim 2, wherein a reinforcing member is provided to the root portion between the crest group closer to the small-diameter mounting portion and the crest group closer to the large-diameter mounting portion.

6. A resin CVJ boot according to claim 1 wherein the means comprise one of the slant faces forming the root portion closest to the S-shaped bend, having a convex surface curved outwardly outside the boot.

7. A resin CVJ boot according to claim 6, wherein a developed length of the curved large-diameter-mounting-portion-side slant face between the crest portion and the root portion is substantially the same with that of a small-diameter-mounting-portion-side slant face forming the other side of the same crest portion.

8. A resin CVJ boot according to claim 6 or 7, wherein at least one or more large-diameter-mounting-portion-side slant face in the crest group closer to the large-diameter mounting portion is formed by a convex surface curved toward outside of the boot.

9. A resin CVJ boot according to claim 8, wherein a developed length of the large-diameter-mounting-portion-side slant face formed by the convex surface curved toward outside of the boot, which is extending between the crest portion and the root portion, in the crest group closer to the large-diameter mounting portion is substantially the same with that of a small-diameter-mounting-portion-side slant face forming the opposed side of the same crest portion.

10. A resin CVJ boot according to any of claim 6 or 7, wherein a difference in diameter between crest and root portions in the crest group closer to the large-diameter mounting portion is made larger than a difference in diameter between crest and root portions in the crest group closer to the small-diameter mounting portion.

11. A resin CVJ boot according to any of claims 6 or 7, wherein a thickness of the root portion between the crest group closer to the small-diameter mounting portion and the crest group closer to the large-diameter mounting portion is larger than a thickness of any other root portion.

12. A resin CVJ boot according to any of claims 6 or 7, wherein an opening angle of the root portion between the crest group closer to the small-diameter mounting portion and the crest group closer to the large-diameter mounting portion is larger than an opening angle of any other root portion.

13. A resin CVJ boot according to claim 1 wherein the means comprise the rigidity of the boot portion closer to the small-diameter mounting portion from the S-shaped bending point being higher than the rigidity of the boot portion closer to the large-diameter mounting portion.

14. A resin CVJ boot according to claim 13, U-shaped grooves formed to root portions other than at least two or more root portions closer to the small-diameter mounting portion from a bending point obtained when the bellows portion displays an S-shaped bend.

15. A resin CVJ boot according to claim 14, wherein a number of the root portions having U-shaped grooves is substantially the same with a number of other root portions.

16. A resin CVJ boot according to claim 14 or 15, wherein a difference in diameter between crest and root portions in the crest group whose root portions are provided with the U-shaped grooves is different from that in the other crest group, and a difference in diameter between crest and root portions in the crest group closer to the small-diameter mounting portion is smaller than that in the crest group, which has the U-shaped grooves, closer to the large-diameter mounting portion.

17. A resin CVJ boot according to claim 1, wherein said means is a structure of the boot wherein a difference in diameter between crest and root portions in the large crest group closer to the large-diameter mounting portion from the bending point obtained when the bellows portion displays an S-shaped bend, is larger than a difference in diameter between crest and root portions in the small crest group closer to the small-diameter mounting portion.

18. A resin CVJ boot according to claim 17, wherein the large crest group includes an inner inscribed line which touches all of the root portions of the large crest group, and an outer inscribed line which touches all of the crest portions of the large crest group, the small crest group including an inner inscribed line which touches all of the root portions of the small crest group and an outer inscribed line which touches all of the crest portions of the small crest group, the inner inscribed lines of the large and small crest groups extending continuously between each other and the outer inscribed line of the large crest group being discontinuously larger than the outer inscribed line of the small crest group so that the distances between the crest portions and root portions of the small crest group are smaller than the distances between the crest portions and the root portions of the large crest group.

19. A resin CVJ boot according to claim 17, wherein the large crest group includes an inner inscribed line which touches all of the root portions of the large crest group, and an outer inscribed line which touches all of the crest portions of the large crest group, the small crest group including an inner inscribed line which touches all of the root portions of the small crest group and an outer inscribed line which touches all of the crest portions of the small crest group, the outer inscribed line of the small crest group being discontinuously smaller than the outer inscribed line of the large crest group and the inner inscribed line of the small crest group being discontinuously larger than the inner inscribed line of the large crest group so that distances between the crest and root portions of the small crest group are smaller than distances between the crest and root portions of the large crest group.

20. A resin CVJ boot according to claim 17, wherein the large crest group includes an inner inscribed line which touches all of the root portions of the large crest group, and an outer inscribed line which touches all of the crest portions of the large crest group, the small crest group including an inner inscribed line which touches all of the root portions of the small crest group and an outer inscribed line which touches all of the crest portions of the small crest group, wherein the inner inscribed line of the small crest group is discontinuously smaller than the inner inscribed line of the large crest group and the outer inscribed line of the small crest group is discontinuously smaller than the outer inscribed line of the large crest group by amounts so that the distance between crest and root portions of the small crest group are less than the distances between crest and root portions of the large crest group.

* * * * *